(12) United States Patent
Dames et al.

(10) Patent No.: US 7,324,728 B2
(45) Date of Patent: Jan. 29, 2008

(54) OPTICAL CONNECTOR WITH TOTAL INTERNAL REFLECTION ABUTTING SURFACE

(75) Inventors: Andrew Nicholas Dames, Cambridge (GB); David Lewis, Stratford upon Avon (GB); Nicholas Parsons, Bury St. Edmunds (GB); Michael Grant, Bishops Stortford (GB); Adrian Holdsworth, Edinburgh (GB)

(73) Assignee: Polatis Ltd, Cambridge (GB)

( * ) Notice: Subject to any disclaimer, the term of this patent is extended or adjusted under 35 U.S.C. 154(b) by 165 days.

(21) Appl. No.: 10/542,680

(22) PCT Filed: Jan. 20, 2004

(86) PCT No.: PCT/GB2004/000174

§ 371 (c)(1),
(2), (4) Date: Jul. 19, 2005

(87) PCT Pub. No.: WO2004/066006

PCT Pub. Date: Aug. 5, 2004

(65) Prior Publication Data

US 2006/0072878 A1    Apr. 6, 2006

(30) Foreign Application Priority Data

Jan. 20, 2003   (GB)   .................. 0301136.8

(51) Int. Cl.
   G02B 6/26    (2006.01)
   G02B 6/42    (2006.01)

(52) U.S. Cl. .................. 385/47; 385/18; 385/25; 385/44

(58) Field of Classification Search ............ None
   See application file for complete search history.

(56) References Cited

U.S. PATENT DOCUMENTS

| | | | |
|---|---|---|---|
| 3,870,398 A | | 3/1975 | Love |
| 4,176,908 A | * | 12/1979 | Wagner ................ 385/47 |
| 5,179,602 A | | 1/1993 | Norcross, Jr. |
| 5,251,278 A | | 10/1993 | Samborsky |
| 5,390,266 A | | 2/1995 | Heitmann et al. |
| 5,666,448 A | * | 9/1997 | Schoenwald et al. ....... 385/44 |
| 6,048,102 A | | 4/2000 | Fukushima |

(Continued)

FOREIGN PATENT DOCUMENTS

DE       196 18 203       11/1997

(Continued)

OTHER PUBLICATIONS

Definition: Optical Switch, Telecom Glossary 2000, Aug. 23, 1996.

(Continued)

Primary Examiner—Tina M. Wong
(74) Attorney, Agent, or Firm—Knobbe, Martens, Olson & Bear, LLP

(57) ABSTRACT

An optical connector (10) comprises at least one optical guide (12) for carrying optical radiations; a total internal reflection surface (11) upon which, in use, said radiations impinge, so that the radiation in the optical guide is reflected by said surface towards an optical element (14) of the connector and means enabling the connector (10) to interlock with any other optical connector which is appropriately matingly configured.

11 Claims, 27 Drawing Sheets

U.S. PATENT DOCUMENTS

| | | |
|---|---|---|
| 6,253,007 B1 | 6/2001 | Laughlin |
| 6,393,174 B1 | 5/2002 | Karaguleff et al. |
| 6,430,332 B1 | 8/2002 | Laor et al. |
| 6,438,283 B1 | 8/2002 | Karaguleff et al. |
| 6,463,189 B1 | 10/2002 | Wu et al. |
| 7,177,494 B1 * | 2/2007 | Minardi et al. ............... 385/16 |
| 2002/0191908 A1 | 12/2002 | Laughlin |

FOREIGN PATENT DOCUMENTS

| | | |
|---|---|---|
| EP | 1 186 932 | 3/2002 |
| GB | 2059621 | 4/1981 |
| JP | 56001909 | 1/1981 |
| JP | 04/366804 | 12/1992 |

OTHER PUBLICATIONS

Application Series: Handling Optical Fiber, Sunrise Telecom Publication No. APP-OPT-003 Rev. B, 2001.

What is an optical switch?, Nortel Networks: Products, Services & Solutions, 1999-2003.

* cited by examiner

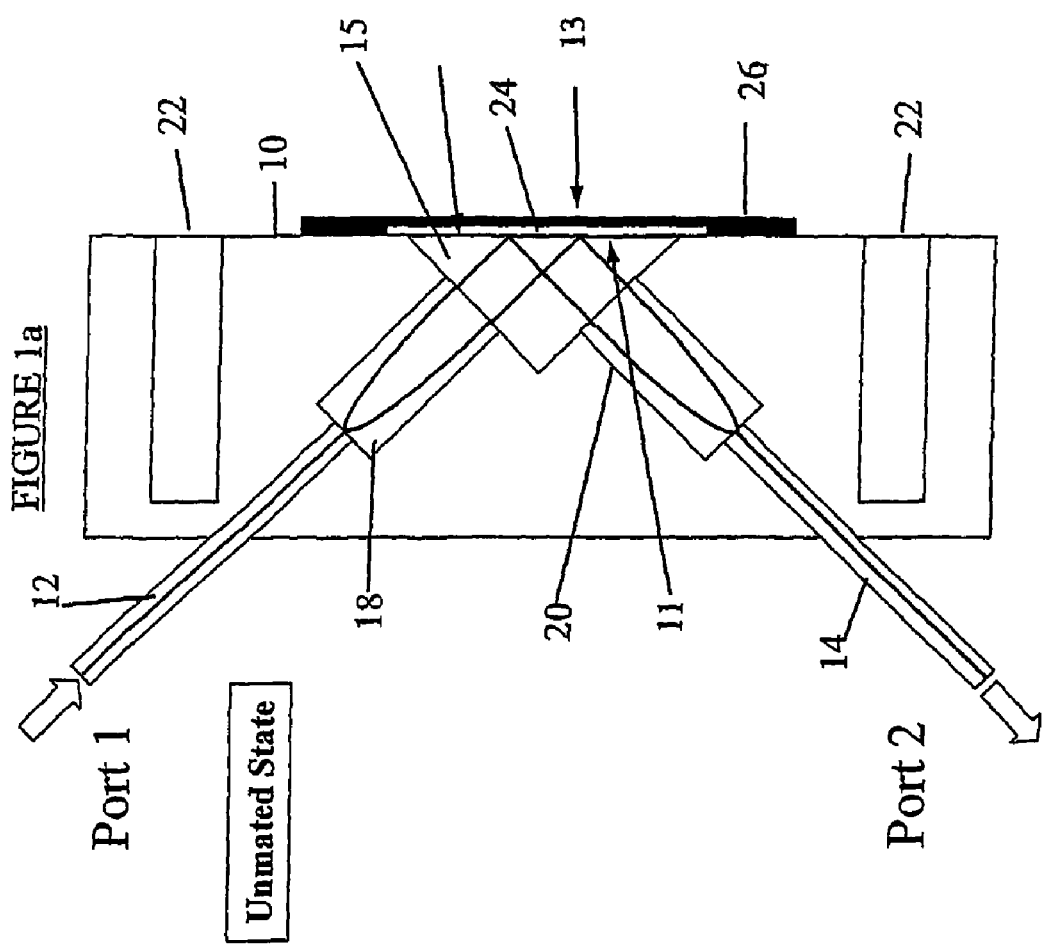

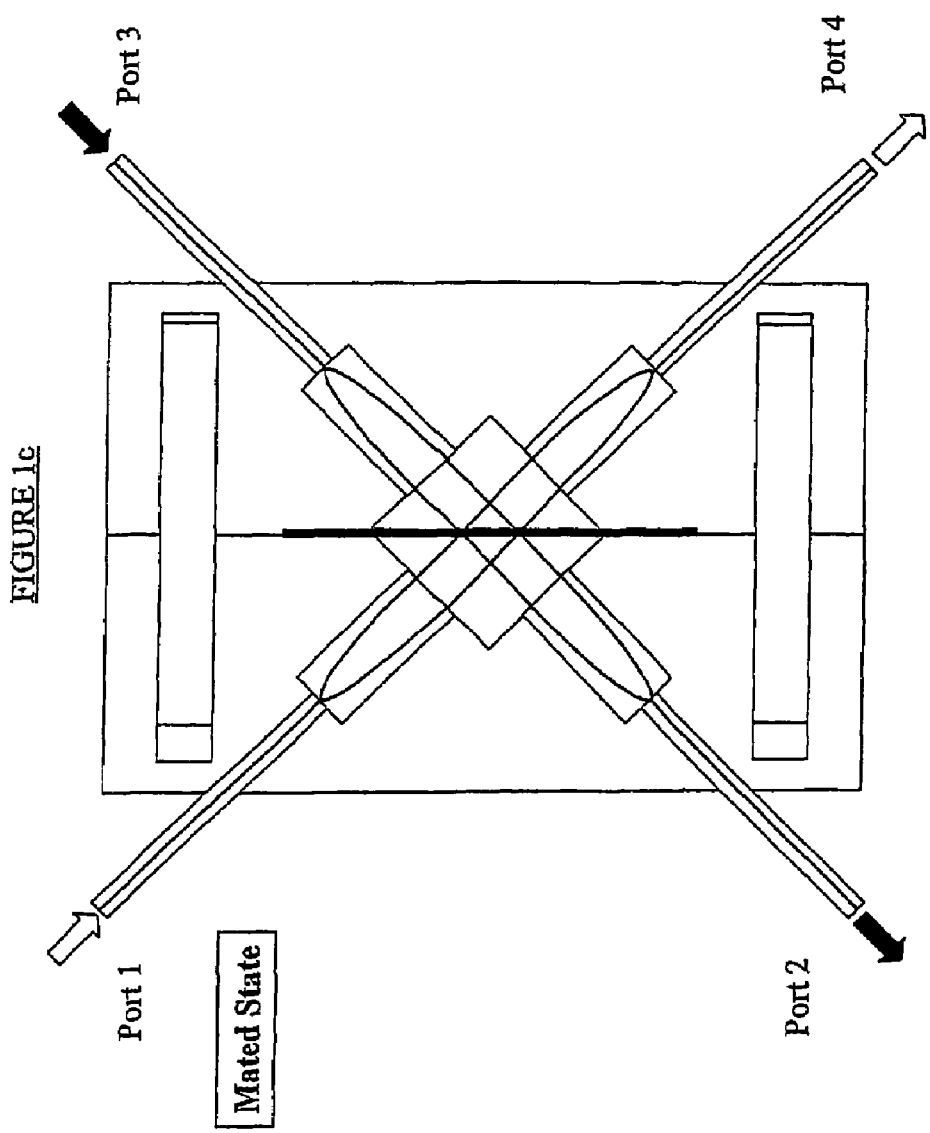

FIGURE 4A
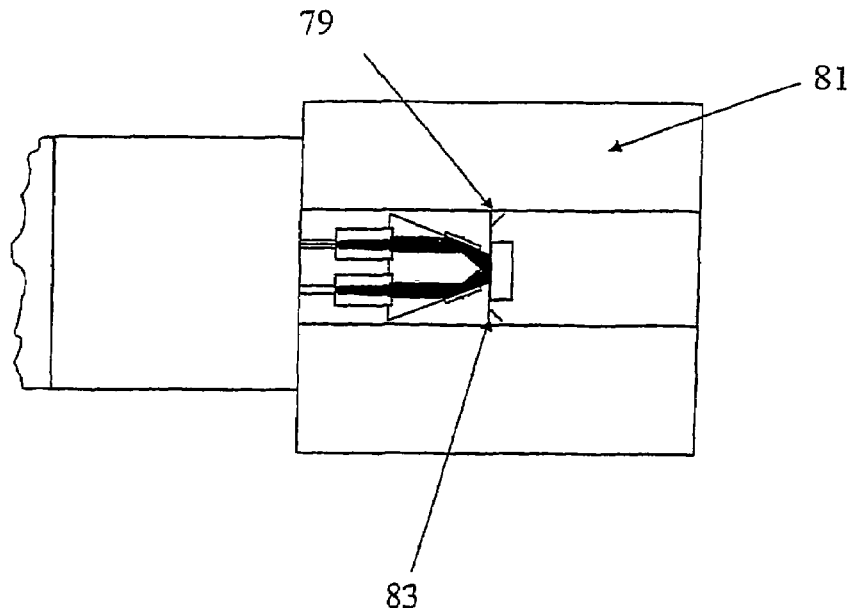
FIGURE 4B
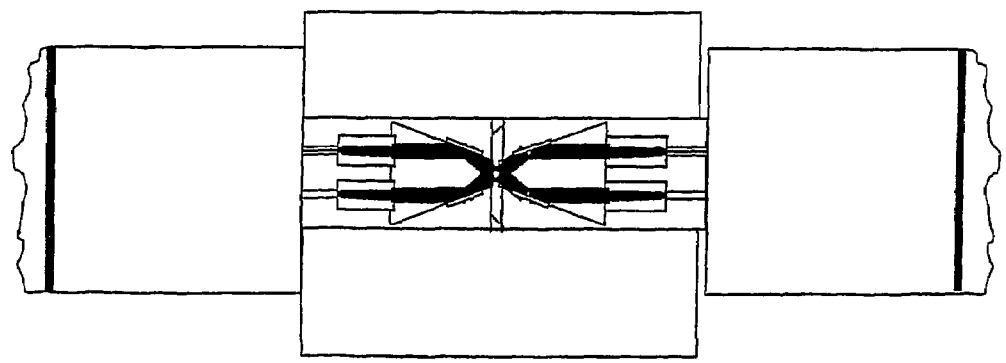
FIGURE 4C
FIGURE 4d
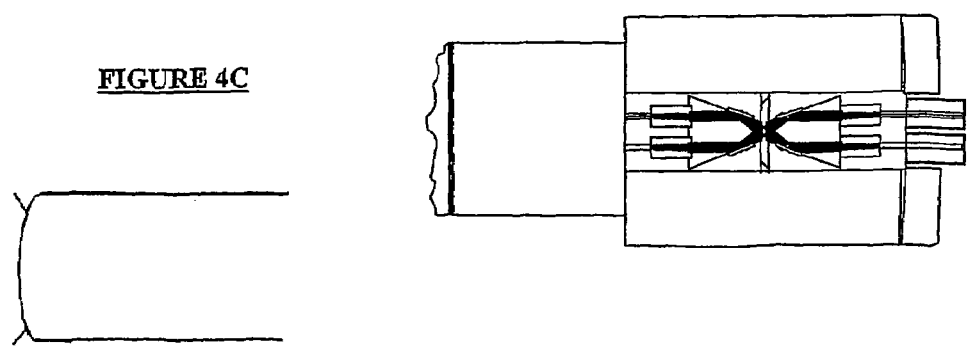

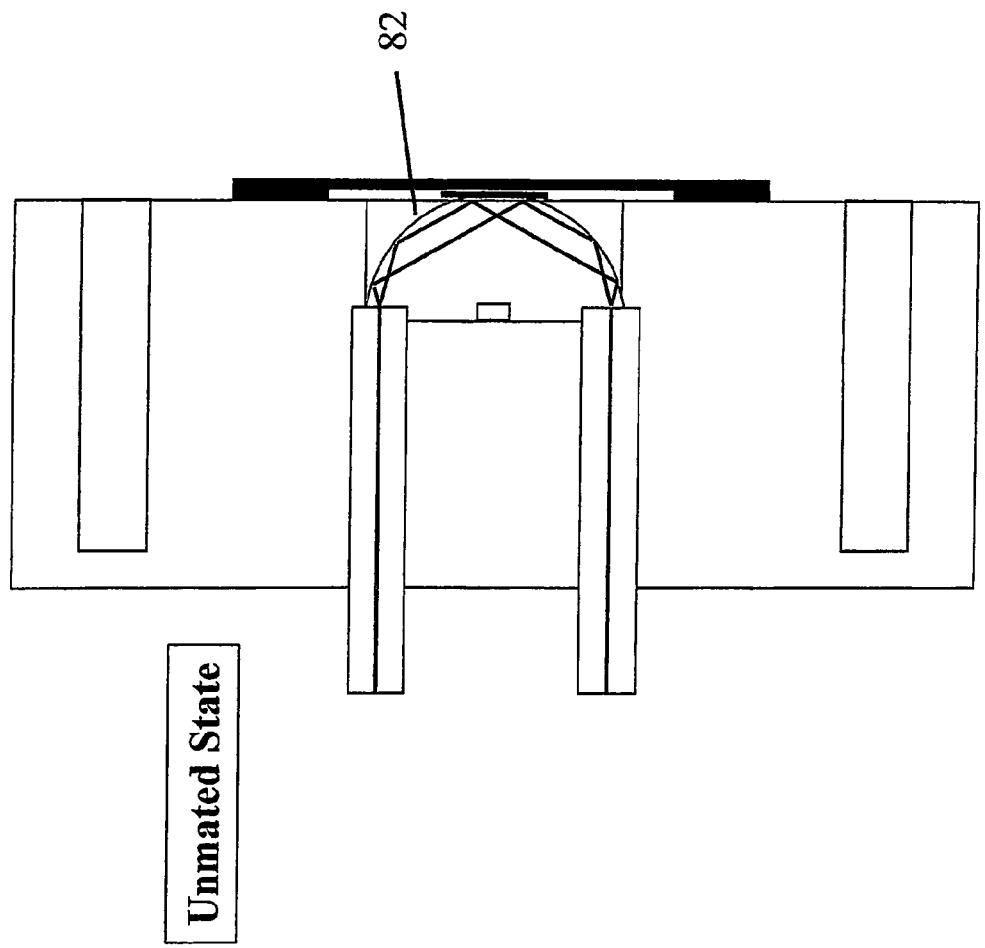

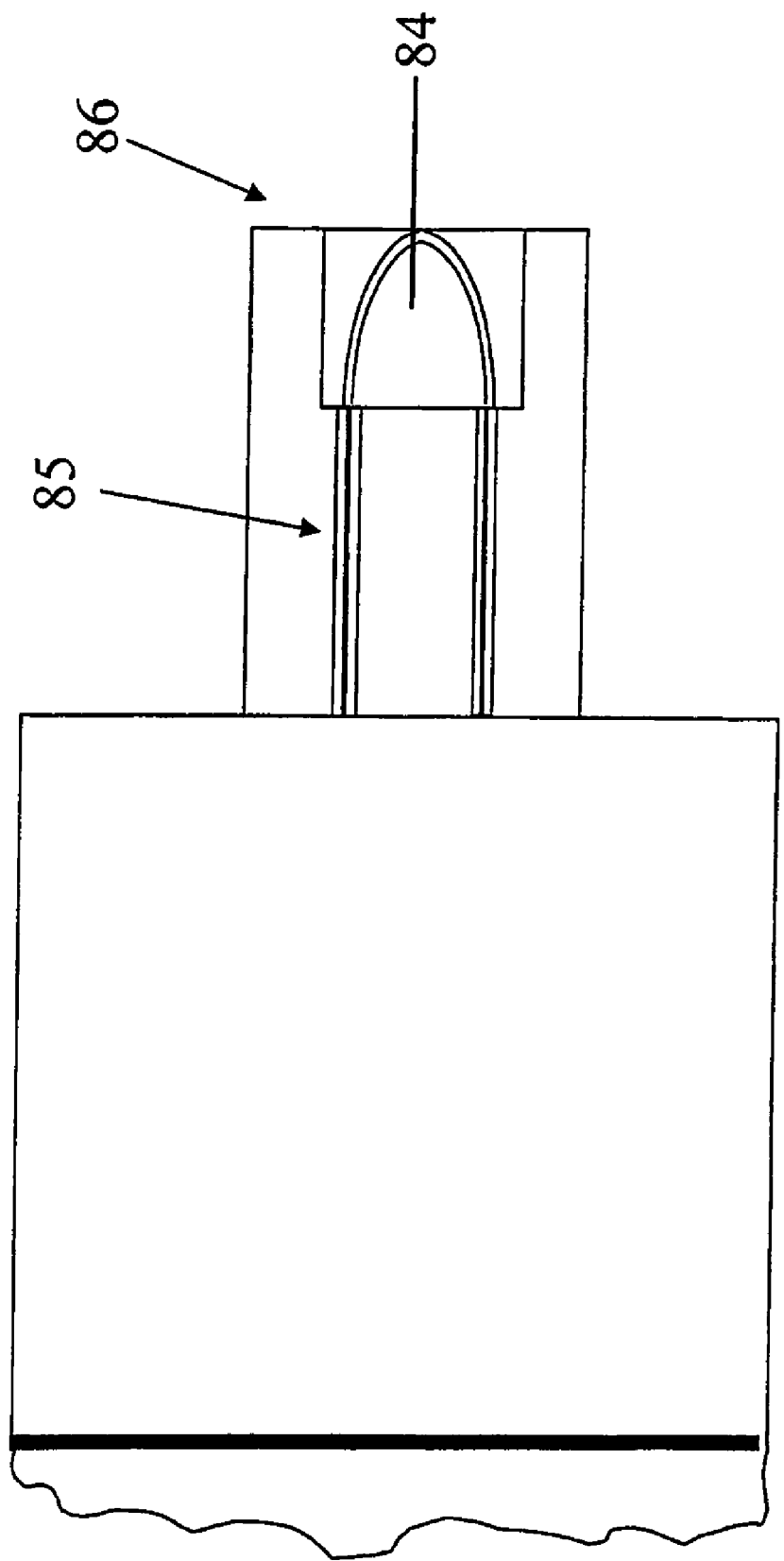

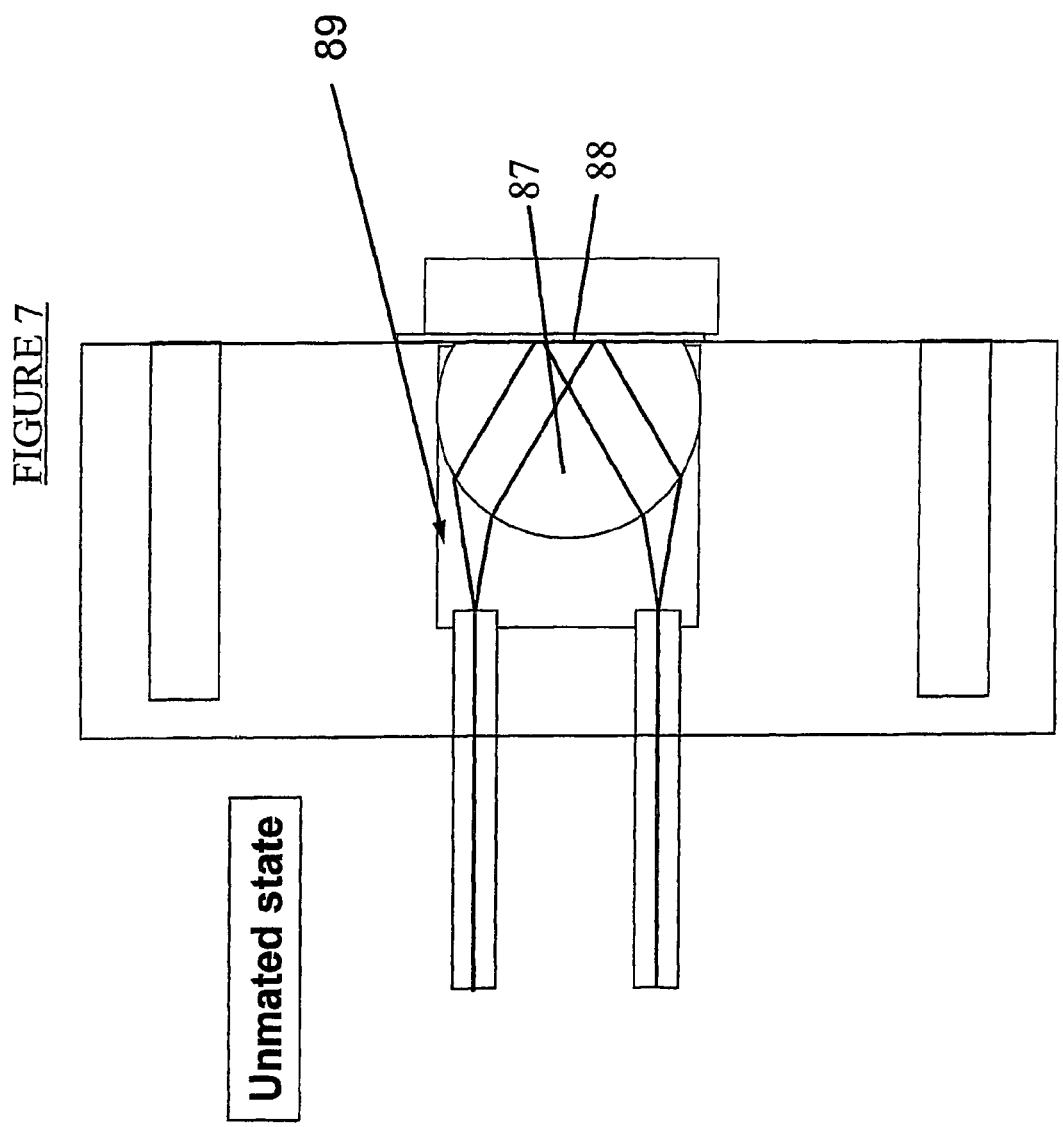

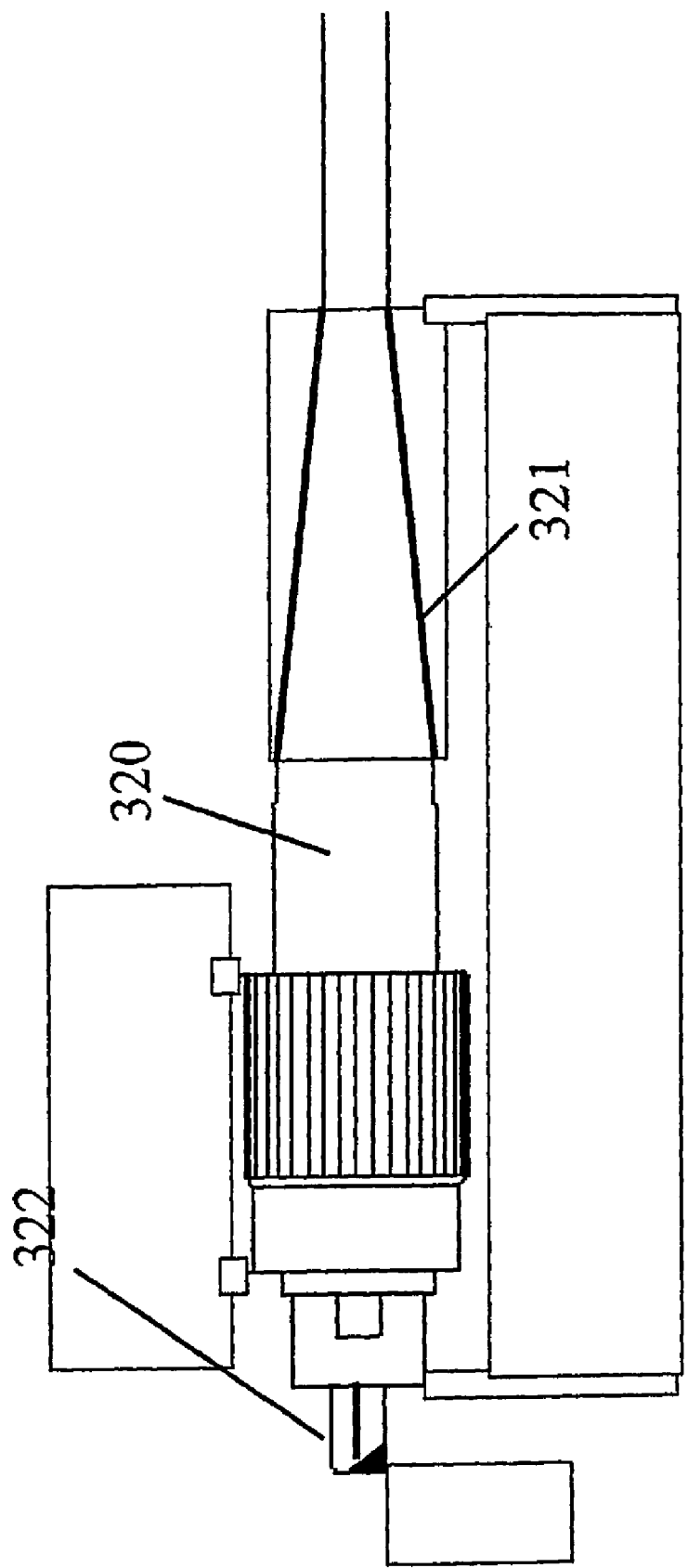

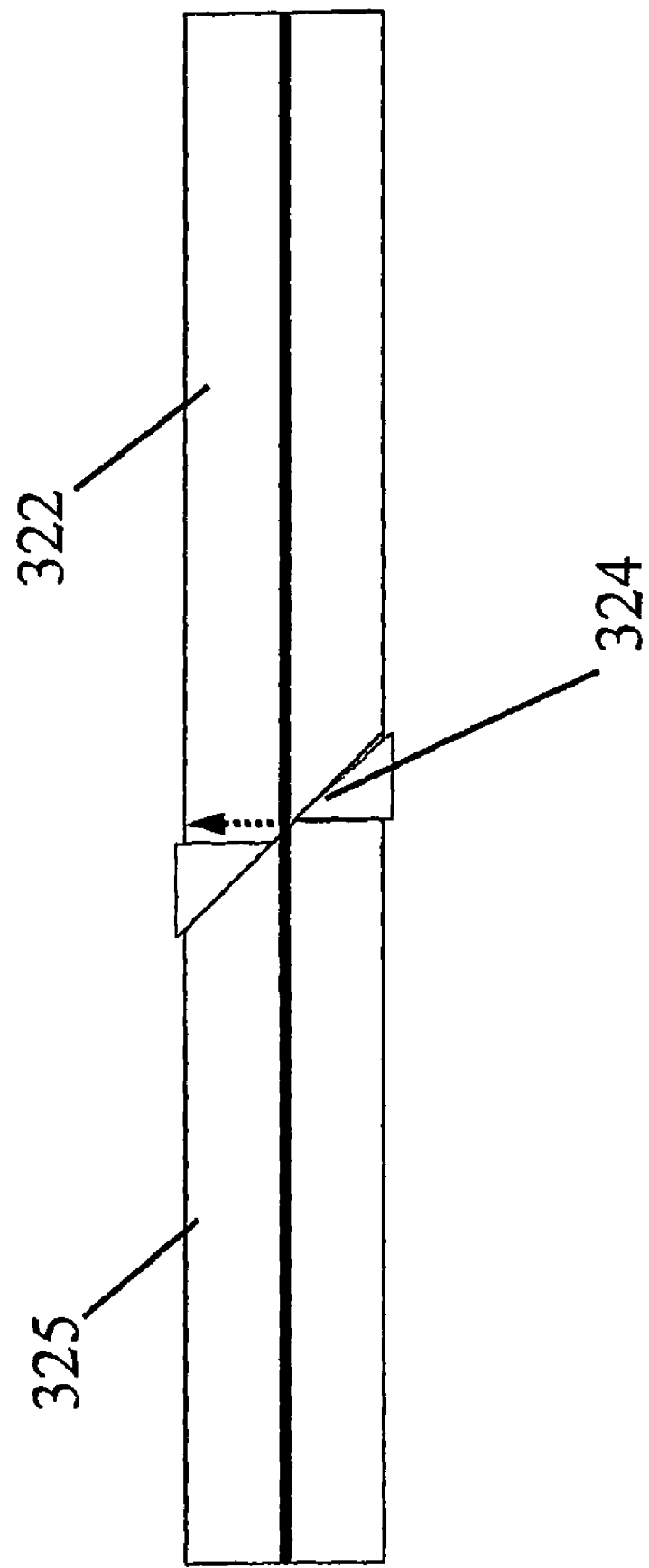

OPTICAL CONNECTOR WITH TOTAL INTERNAL REFLECTION ABUTTING SURFACE

FIELD OF THE INVENTION

The invention relates to optical connectors. The optical connectors in question may be used in a wide variety of application for example optical connector arrangements for use in a fibre-optic communications system, optical network sections. They may also be used for example in improved methods to increase the functionality of an optical network.

BACKGROUND TO THE INVENTION

One of the major problems in designing optical networks is in the placement of the optical components on the network. Design decisions on the inclusion and placement of components need to accommodate not only the initial traffic on the network, but also future network growth, which is often unpredictable. This issue is especially critical for Metropolitan (or city) networks where cost needs to be minimised and growth is especially unpredictable.

The normal approach to the problem is to include enough elements initially to accommodate currently foreseen traffic growth, and to take a part of the network out of commission where additional upgrade needs to be accommodated. This is difficult to do while minimising impact on existing traffic, and is a major operational expense. Taking part of a network out of commission may involve truck-rolling and splicing a new network element into the existing network as and when required. This involves a heavy operational cost and can mean the network ring or line system is out of commission for hours at a time. A further option is to install an in-line connector into the network where it is thought that a future upgrade may be required and then truck-roll and connect a new element when it is actually needed. This also incurs a high operational cost, though the "down time" involved is less than in the previously mentioned case (tens of minutes instead of hours). Finally, it is possible to install a 2×2 optical switch where the future upgrade may be required, the switch being operated to include the new element in circuit when the need actually arises. While this is fast (<10 ms is normally required for such switching), the reliability is lower and there are higher losses, since two passes of the signal occur and in addition two connectors are involved. Furthermore, most such switches require a source of power and will increase the first-in cost of the network.

THE PRIOR ART KNOWN TO THE APPLICANTS

Several prior art devices were identified in the following documents:
EP 1186932 A2
U.S. Pat. No. 6,393,174
U.S. Pat. No. 5,390,266
U.S. Pat. No. 4176908

Whilst some of these disclose devices with a total internal reflection surface, none of these discloses the following aspects.

SUMMARY OF THE INVENTION

In its broadest aspect, the invention provides an optical connector comprising at least one optical guide for carrying optical radiations; a total internal reflection surface upon which, in use, said radiations impinge, so that the radiation in the optical guide is reflected by said surface towards an optical element of the connector and means enabling the connector to interlock with any other optical connector which is appropriately matingly configured.

This configuration is particularly advantageous because it allows the upgrading of an existing optical line with absolutely minimal disruption to traffic. It simplifies network planning by allowing later upgrades with optical add-drop multiplexer (OADM) filters, etc, again with minimal impact on existing traffic. It reduces capital expenditure by enabling a pay-as-you-grow policy to be followed. It decreases operational expenditure by simplifying the upgrading process. It improves network performance by eliminating unnecessary components and by allowing in-service upgrades with amplifiers and DSCM s(dispersion compensation modules), etc.

In a subsidiary aspect in accordance with the invention's broadest aspect, the surface is such that, in use, the radiation in the optical guide may be reflected by said surface towards an optical element of the connector and may alternatively, in use, be such that its internal reflection properties may be frustrated to allow the radiation to pass across the surface.

In a further subsidiary aspect, the connector comprises means enabling the connector to interlock with any other optical connector which is appropriately matingly configured and which incorporates means which will frustrate the total internal reflection of the first said connector if and when the connector were to be interlocked with any such other connector; and with the interlock-enabling means of the connector being so operatively positioned that, with the connector interlocked to another suitable connector as aforesaid, the total internal reflection surface of the connector will be in sufficient proximity to the total internal reflection frustrating means of the other connector as to allow the optical radiations to pass across the connection then formed by the two interlocking connectors.

In a subsidiary aspect in accordance with the invention's broadest aspect, said optical element towards which radiation is reflected in said first mode treats the radiation so that eye-damaging radiation remains within the connector, thereby advantageously the connector may achieve an eye-safe operation.

In a further subsidiary aspect, said connector comprises a plurality of optical guides. This configuration would be particularly advantageous when such a connector operates in a second mode with a similar mating connector so that the connection allows radiations to be switched from one connector port to another.

In a further subsidiary aspect, the interlocking means allow a mating connector to be first attached in non-surface frustrating manner and then incorporates a mechanism which provides a snap-action final closure for the frustration of the surface.

In a further subsidiary aspect, additional reflection means are provided between the optical guides and the surface. This advantageous configuration may for example allow optical guides to be parallel within the connector and even normal to the total internal reflection surface.

In a further subsidiary aspect, refractive means are provided between the optical guides and the surface which are adapted to change the radiation's direction as emitted from the optical guides to the direction of the radiation incident on the total internal reflection surface. This may also allow optical guides to be parallel within the connector and even normal to the total internal reflection surface.

In a further subsidiary aspect, the total internal reflection surface is located on at least two sides of a prism. This configuration will for example be particularly advantageous as it will allow the mating connector to dispose at an angle (eg. 90 degrees from the connector).

The invention also provides a multiple-connector system comprising a first optical connector in accordance with any of the preceding aspects in combination with one or more other optical connectors, each of which other connectors is appropriately matingly configured to interlock with said first optical connector in the way envisaged in the invention's third aspect above and with the result outlined therein.

BRIEF DESCRIPTION OF THE DRAWINGS

FIGS. 1a, 1b and 1c show three different phases in the use of an optical connector according to the invention in a first embodiment thereof;

FIGS. 4a, 4b, 4c and 4d illustrate a variant version of the second embodiment;

FIG. 5 is a diagram of a third embodiment of an optical connector in accordance with the invention;

FIG. 6 is a diagram of a fourth embodiment of an optical connector in accordance with the invention;

FIG. 7 is a diagram of a fifth embodiment of an optical connector in accordance with the invention;

FIGS. 24a and 24b are diagrams illustrating a further embodiment of an eye-safe optical connector according to the invention.

DETAILED DESCRIPTION OF EMBODIMENTS OF THE INVENTION

Figure 1B:
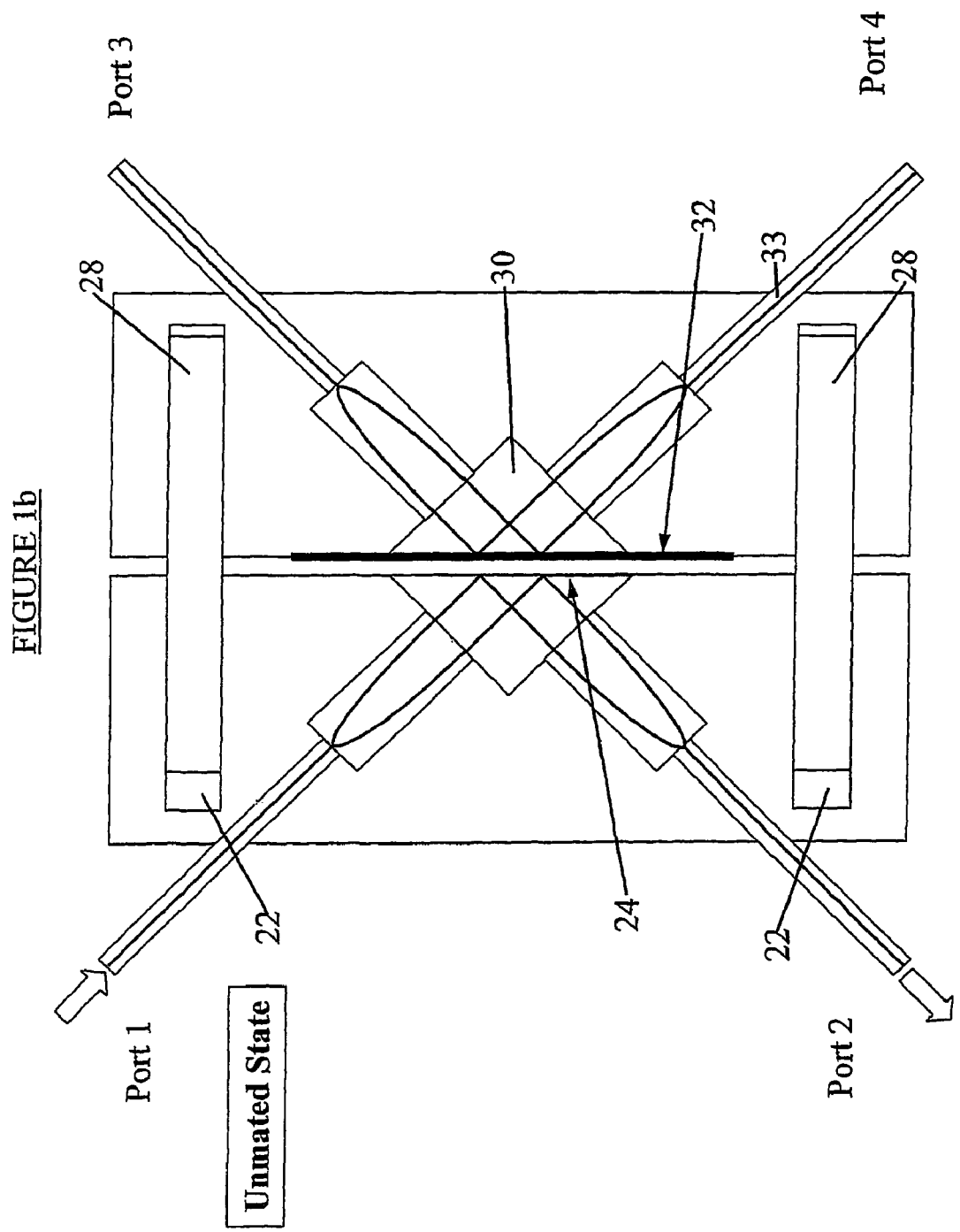

FIG. 1a shows a connector comprising a body 10 which accommodates first and second optical guides 12, 14, each of which connects at one end to a refractive element 16 by way of respective collimators 18, 20 which, in the illustrated embodiment, is a graded-index lens (a "GRIN" lens). In a first mode of operation, the connector may operate detached from any other connector so that the radiation from optical guide 12 is reflected towards optical guide 14 via the total internal reflection surface 11 at the glass-air interface. A protective film 13 is provided which defines an air gap 15.

The term 'interlocking' in this description is to be interpreted broadly, it includes within its meaning all forms of mating attachment, contact with mutual support, intertwining and other forms of connection other than simple connector to connector face contact.

Also included in the body 10 are interlocking means which include two or more alignment apertures 22 for the accurate alignment (in a second mode of operation). The further connector may be selected so that when the connectors mate the total internal reflection surface allows the optical radiations to pass across the connection.

FIG. 1b shows two connectors or connector portions attached to one another via alignment apertures.

The operation of a first connector-portion in a first mode of use of the connector depends on the presence of an airgap (or low index medium or vacuum) at a face 24 of the refractive element 16 and, in order to protect this refractive-element/airgap interface from fouling, a protective cover 26 is preferably affixed thereto by some suitable method which will be readily apparent to the person skilled in the art of optical connector design.

In a first mode of use of the connector, in which the first connector-portion is separated from the second connector-portion, an optical signal input at Port 1 of the first connector-portion will undergo total internal reflection at the glass-air interface 24 and exit from Port 2. Thus, where for example the first connector-portion is included in a network ring, the signal transmitted to Port 2 will be available for use elsewhere in the ring.

Assuming now that the ring is to be extended—in the manner of a retrofit—by the addition of some kind of optical element (e.g. an add/drop multiplexer), the protective cover or film 26, where one is supplied, is removed and a second connector-portion substantially identical to the first is offered up to the first connector-portion and aligned using alignment pins 28 or similar, which are inserted into the apertures 22 (see FIG. 1b). This second connector-portion also has a refractive element, shown as element 30 in FIG. 1b, but in this case this element has, in a preferred realisation, an index-matching material 32 coating an external face of the refractive element 30. This second connector-portion is offered up to the first connector-portion until only a very small airgap still exists between the total internal reflection surface 24 and the material (e.g. of the order of 50 microns.). Then, in a process which takes much less than 10 ms (in practice <1 ms), the second connector-portion is pushed all the way towards the first connector-portion until the two opposing surfaces of the refractive elements 16, 30 are in firm contact with each other (FIG. 1c). This firm contact, assisted by the presence of the matching material, ensures that no internal reflection takes place in the first connector-portion and consequently the optical signal at Port 1 is passed through into the refractive element 30 and on into the optical guide 33 and out through Port 4. Likewise, a signal which enters the second connector-portion at Port 3 is passed on to the optical guide 14 and out through Port 2. To ensure that optical crosstalk in the mated connector is desirably less than −50 dB between ports 1 and 2, the index matching material should typically be within 0.2% of the index of the refractive element.

The mating of the two connector-portions constitutes a second mode of use of the connector, in which an optical element is brought into play in the network which was not present before. This introduction of a new optical element, which is connected to Ports 3 and 4, is achieved with acceptably low loss, causes minimal interruption of traffic and can be provisioned at very low cost, in contrast to the known conventional methods of extending an optical network described earlier.

Figure 2:
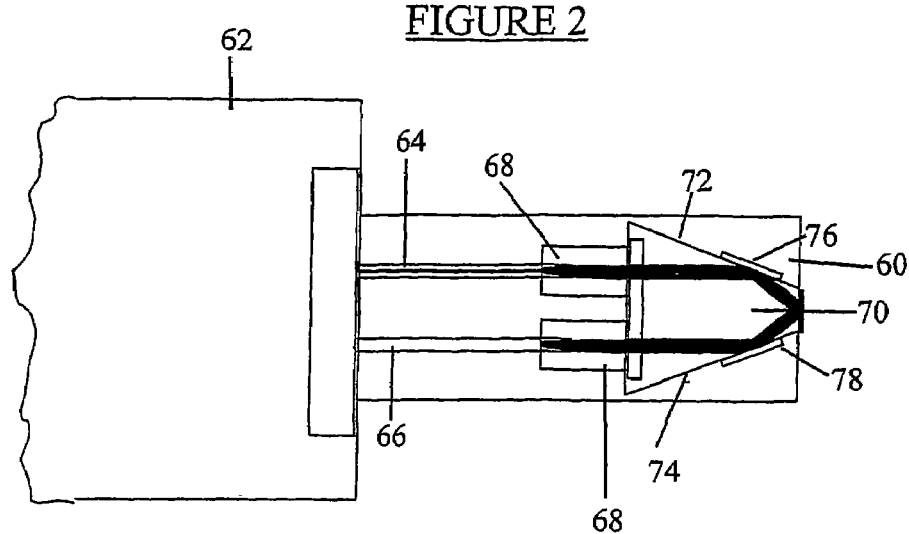
FIG. 2 is a diagram showing a second embodiment of a first connector-portion of an optical connector according to the invention.

A second embodiment of the optical connector according to the invention is shown in its first mode of use in FIG. 2. In this embodiment, a ferrule 60 is attached to a connector body housing 62, which accommodates normal items such as spring contacts, a latching mechanism and a form of strain relief. The ferrule contains first and second optical-signal guides, i.e. lengths of optical fibre 64, 66, which—as in the first embodiment—feed into a collimator element 68 such as a GRIN lens, the collimators leading into a refractive element 70, on two walls 72 and 74 of which a reflecting means 76, 78 is provided. These reflecting means may take the form of a local airgap or gap filled with some other low-index medium or a vacuum or a reflecting surface applied to the outside of the surfaces 72, 74.

Figure 3:
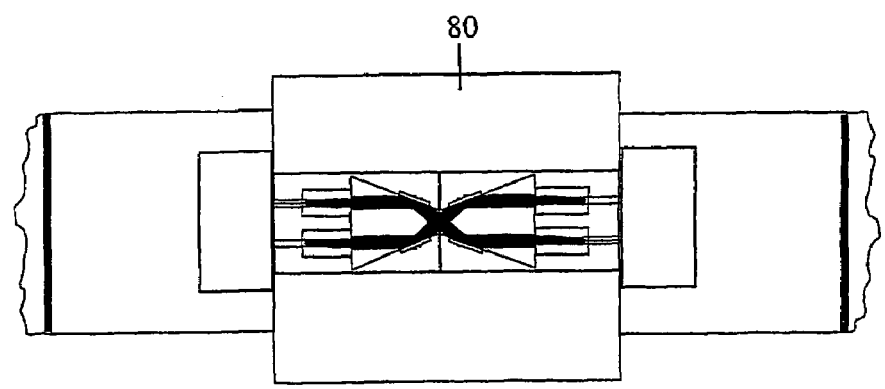
FIG. 3 is a diagram showing the embodiment of FIG. 2 in its "mated" (second mode of use) state.

The use of these reflecting means allows the fibres 64, 66 from Port 1 and Port 2 (not shown) to exit from the connector housing 62 substantially parallel to one another. This has a number of advantages in fabrication and use, due to the fact that the connector can then employ construction technologies which are commonly used with standard fibre-optic connectors. FIG. 3 shows two such connector-portions mated together in the second mode of use using a receptacle 80, which aligns the connector-portions correctly.

A similar arrangement is shown in FIG. 4*a*, but incorporating two additional features. The first feature is that one or both front surfaces of the connector-portions is polished to create a slight curvature in the mating surfaces 83, e.g. of the order of 20 mm radius, which is common in FC/PC fibre-optic connectors. Now when the connector-portions are mated, the closure force flattens the end of the connector-portion(s) slightly so as to ensure a very good physical contact over the centre of the mating surface. Typically, the connection force may be around 1 kg and the glass would be flatted over an area of around 250 microns diameter.

The second feature is the inclusion of a snap-closure mechanism, such as a Belville™ washer 79 just in front of one of the surfaces to be mated. This is best achieved by inserting the first connector-portion ferrule into the aligning receptacle (e.g. a bullhead connector mount 81) from one end and then inserting the washer into the receptacle from the other end until it touches the outer periphery of the total internal reflecting surface of the first connector-portion. Finally, the second connector-portion is inserted from the second end of the receptacle and pushed in until the mating surface of the second connector-portion just touches the Belville™ washer at its outer face (see FIG. 4*b*). The curvature in the washer automatically ensures a suitable minimum spacing (10-100 microns) between the two mating surfaces. Further pressure on the second connector-portion forces the washer to yield and flatten and, since the washer only occupies an outer part of the total internal reflecting surface of the first connector-portion which is less protrusive than the inner part (see FIG. 4*c*), the two mating surfaces can be brought together successfully. (There may be a more compliant spring at the back of the connector housing which can easily extend by the 10-100 micron distance without a significant reduction in force.)

It is stressed that the Belville™ washer feature is not a requirement where a curved mating surface is used, but only an enhancement, allowing as it does an improved speed and control of the final closure of the connector-portion pair.

Instead of providing a continuous curvature on one or both of the mating surfaces, a stepped surface configuration (not shown) may be employed, whereby a flat, or even curved, mating surface gives way to a recess in which the washer sits, the recess of course being of such a depth that the washer is still able to perform its distancing function vis-à-vis the opposing mating surface.

An additional feature shown in FIG. 4*d* is the incorporation of a pair of TIR (total internal reflection surfaces) interfaces internally to a connector which is terminated in a conventional connector construction. Mechanical features embodied in this connector push the two TIR surfaces together when this connector is mated to a conventional connector or connector pair. This has the advantageous feature of providing a sealed volume to protect the TIR surfaces, and the further advantageous feature of permitting interoperation with conventional connectors.

A third embodiment of the optical connector according to the invention is illustrated in FIG. 5. This shows a curved refractive element 82 (a hemispherical ball lens), which performs the same reflective functions as the element shown in FIGS. 2 and 3, but in addition uses its curved surface to perform the collimation and focussing operations.

In a fourth embodiment, shown in FIG. 6, a ferrule 86 incorporates a Graded Index (GRIN) Lens 84 employed to perform both the focussing and beam deflection functions for radiation from fibre 85. This is preferably a high aperture GRIN, with a numerical aperture of approximately 0.6, with, for example an index of 1.468 at the radius where the fibre cores are attached (SMF28 fibre), thereby minimising back reflection, and an index of 1.85 at the centre, giving a beam incidence angle of ~35 degrees to the normal. This comfortably exceeds the critical angle of 32 degrees between the high index material and air.

The Grin lens is ¼ of a pitch long (hence will translate position at the fibers to angle at the centre of the mating surface). With the fibres as close together as possible, which is advantageous as it reduces the angular alignment tolerance of the connector ferrules), a typical length of the lens of around 0.2 mm, with a diameter at the fibre cores of around 125 mm, and an overall diameter of between 0.150 and 0.25 mm. For ease of handling, the length can be increased to ¾ of a pitch if desired. This is a particularly advantageous structure to assemble due to the circular symmetry of the parts—the GRIN lens is a short section of a cylinder, the main ferrule can have a hole 3 times the fibre diameter with seven fibres in (as in FIG. 16), or their can be two fibres very close to each other in a dual hole ferrule, with the cylindrical lens attached to the end in a recess in the ferrule. The index range in the grin lens needed is large, and can be made by fusing concentric tubes of different glasses together, prior to drawing down.

FIG. 7 shows a fifth embodiment incorporating a ball lens 87 with a polished planar total internal reflection surface 88 at the glass-air interface. The lens is set to perform the deflection and collimation functions by refraction at the curved interface. A space 89 is provided between the optical guides and the ball lens which may be filled with air, a vacuum or any other appropriate low index fluid.

Figure 8:
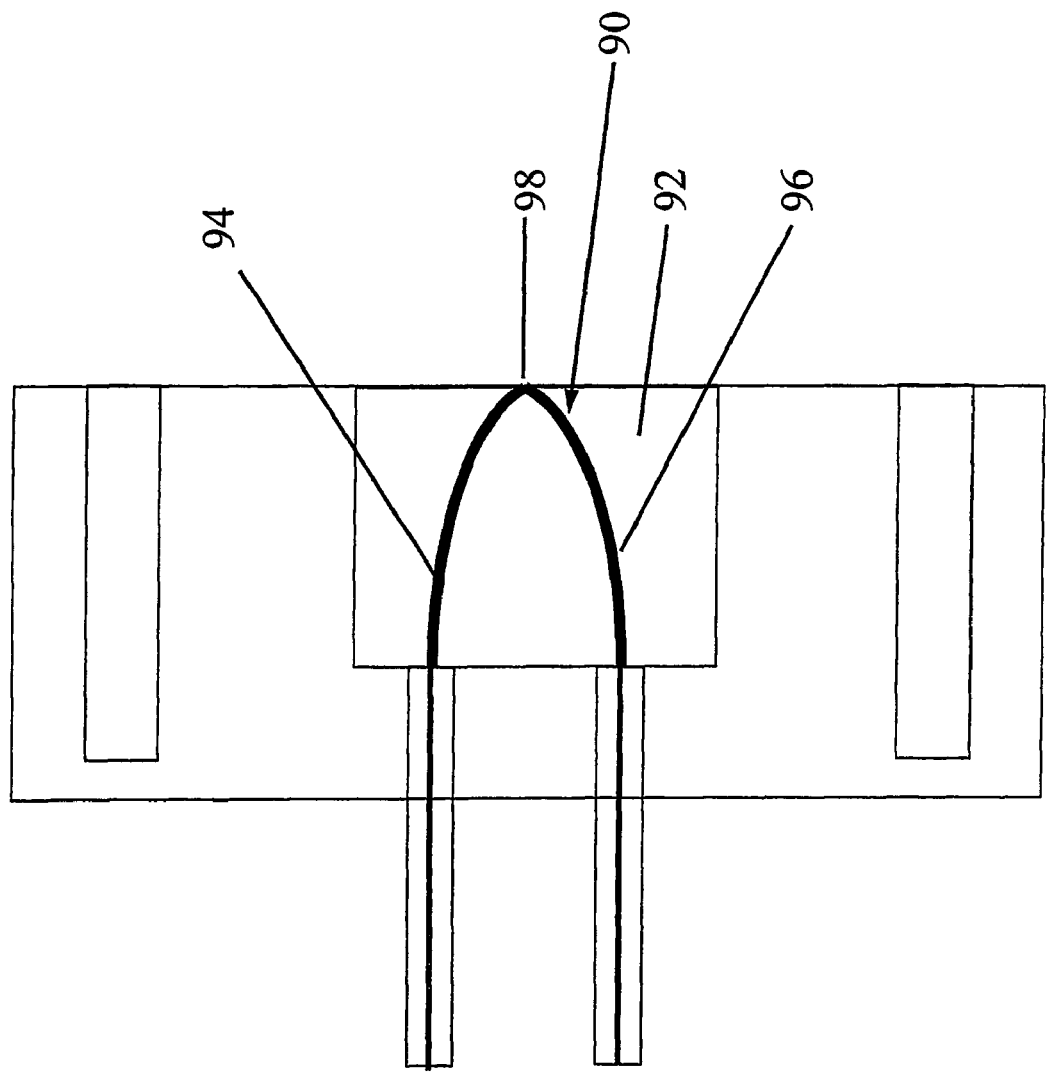
FIG. 8 is a diagram of a sixth embodiment of an optical connector in accordance with the invention.

FIG. 8 shows a sixth embodiment incorporating an optical waveguide structure 90 on an optical substrate 92 (e.g. silica-on-silicon waveguides or ion-exchanged waveguides). The structure, which comprises two individual waveguides 94, 96, compels the optical radiation to/from the total internal reflection surface to meet at a point 98 on that surface.

Figure 9:
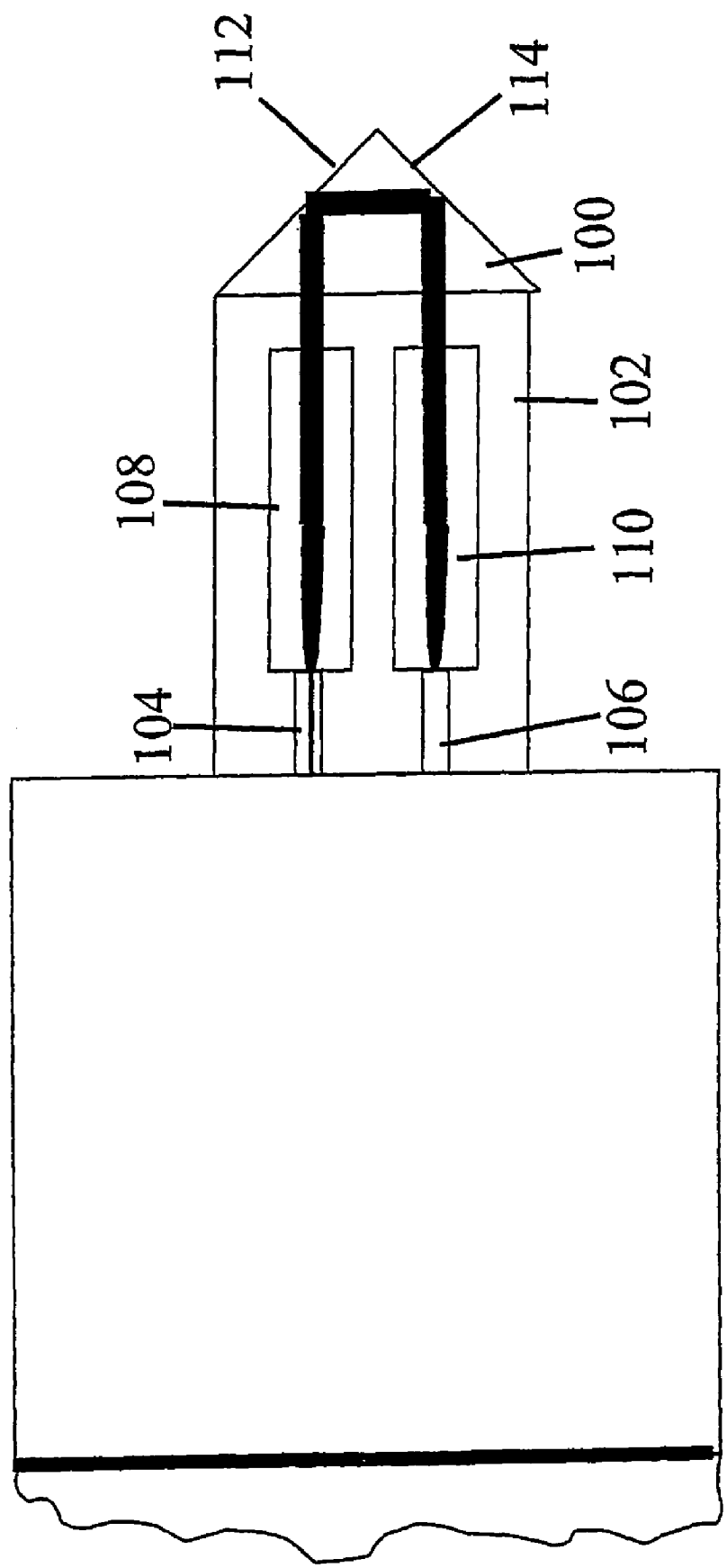
FIG. 9 is a diagram of a seventh embodiment of an optical connector in accordance with the invention.

A seventh embodiment of the optical connector according to the invention is illustrated in FIG. 9, which shows a prismatic element 100 attached to the end of a ferrule 102 accommodating the optical guides 104, 106 in combination with respective collimating means 108, 110, which again may consist of a GRIN lens. The prismatic element 100 provides two reflective interfaces 112, 114 which, in the first mode of use of the connector-portion, cause total internal reflection of the incident optical radiation from input to output.

Figure 10:
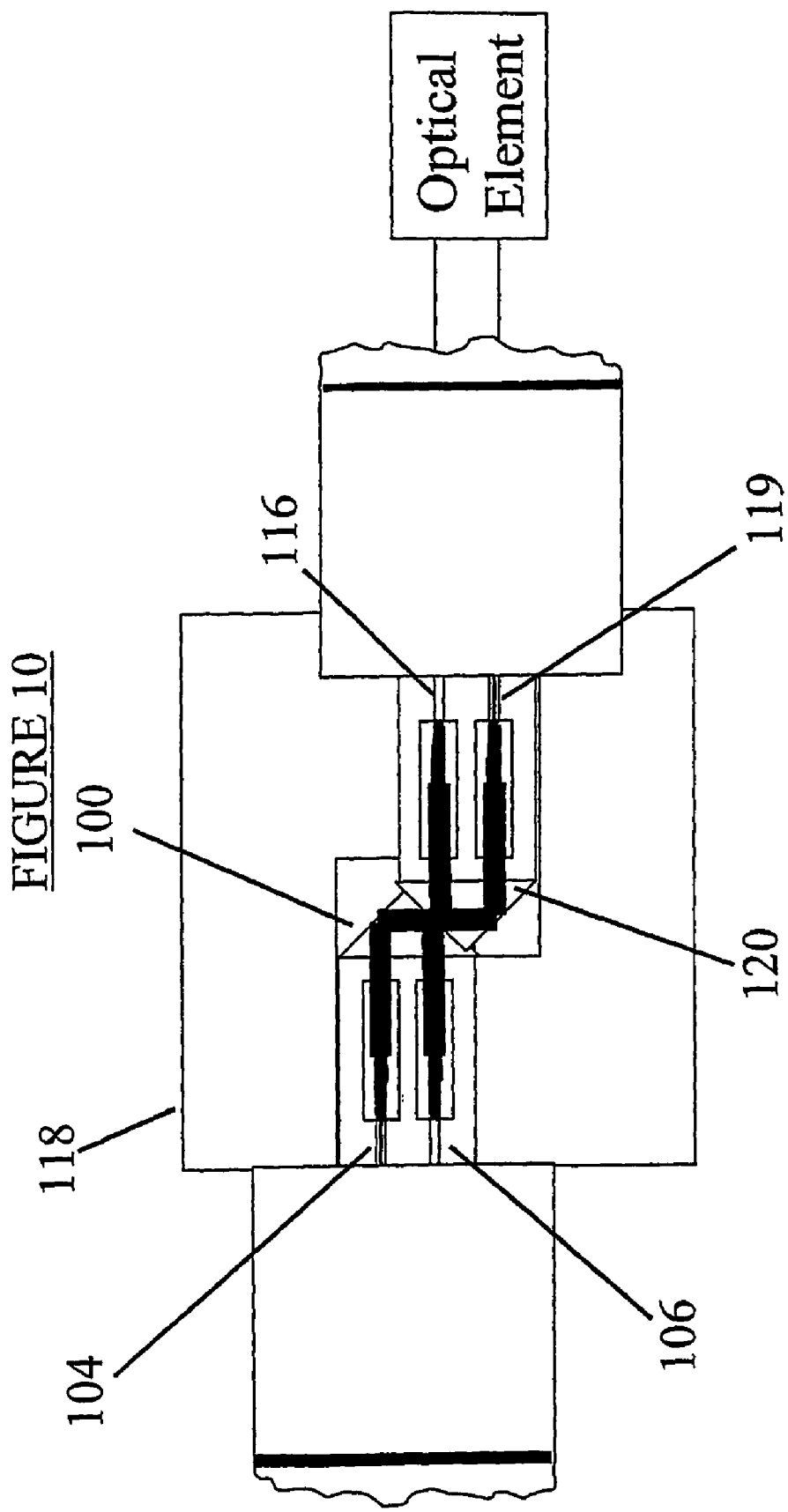
FIG. 10 is a diagram of the seventh embodiment in a first version of its "mated" (second mode of use) state.

FIG. 10 shows a pair of such connector-portions mated in a quasi-collinear fashion using a suitable receptacle, e.g. a bulkhead connector mount 118. Here the optical radiation in the optical guide 104 is reflected twice by the two prismatic elements and enters the optical guide 119 to feed an optical element coupled to the second connector-portion, the optical radiation returned by the optical element then entering the optical guide 116, from where it passes from the second prismatic element 120 into the first prismatic element 100 and out through optical guide 106.

Figure 11:
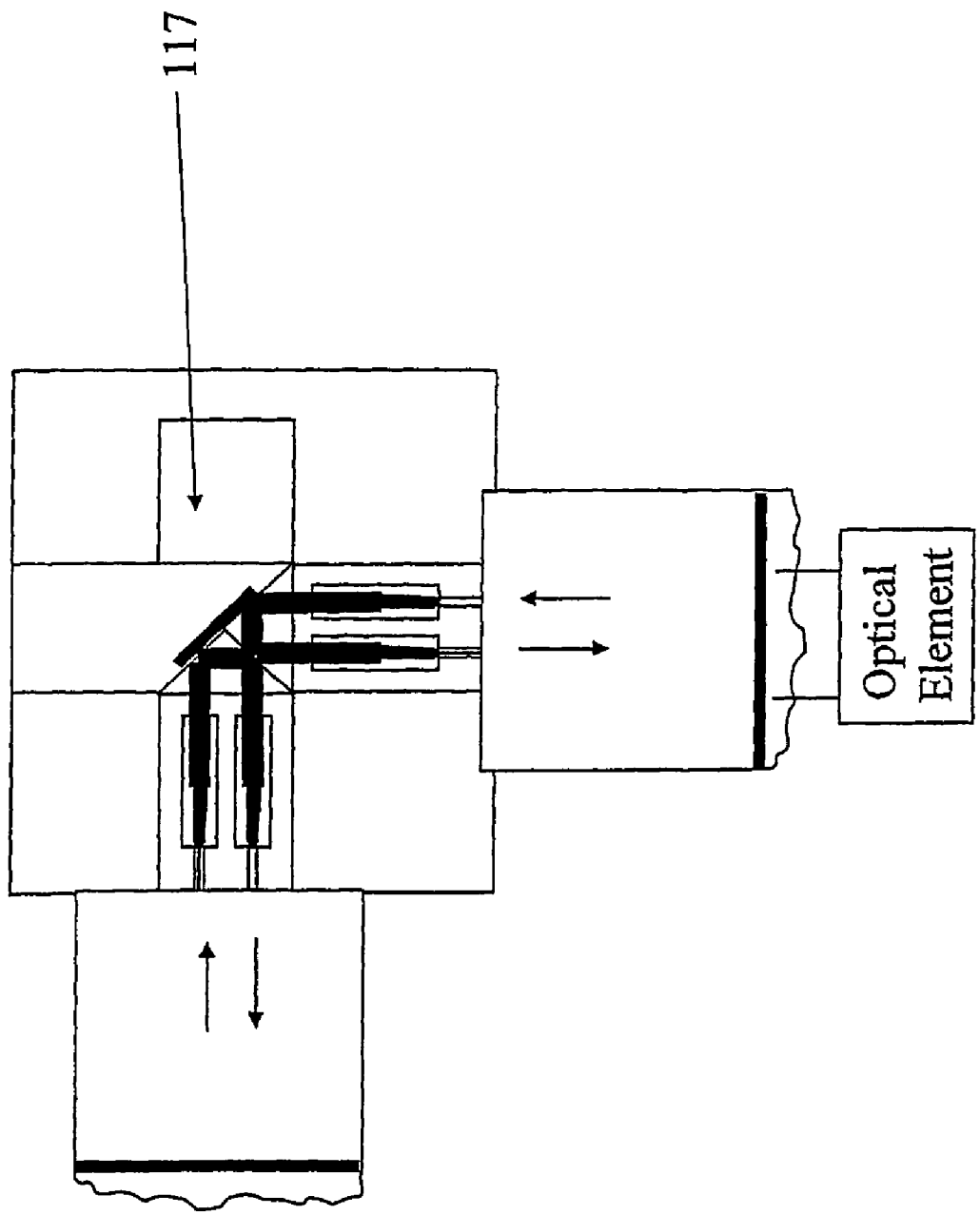
FIG. 11 is a diagram of the seventh embodiment in a second version of its "mated" (second mode of use) state.

FIG. 11 shows an alternative version of the same arrangement where the two connector-portions are mated at an angle close to 90° within a receptacle 117. This arrangement can have advantages in telecommunications equipment, since it reduces the space needed to accommodate fibre-bend radii by providing a "corner reflector" function. The optical-signal paths are as shown by the arrows.

Figure 12:
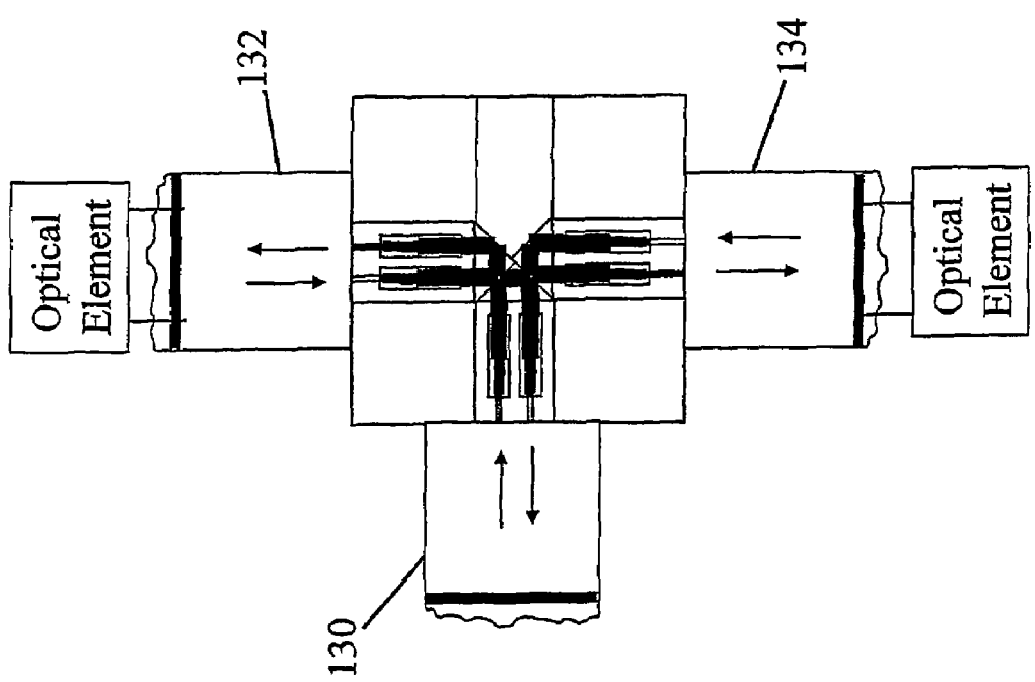
FIG. 12 is a diagram of the seventh embodiment in a third version of its "mated" (second mode of use) state.

FIG. 12 shows yet another alternative version of the same arrangement, but this time exploits the fact that there are two reflecting surfaces in the prismatic element employed, such that two independent connector-portions 132, 134 can be mated with the first connector-portion 130. This arrangement has the advantage that, although it provides the function of two connectors, the through-loss in the unconnected state (first mode of use) of the first connector-portion 130 is that of a single connector only. The optical-signal paths are again shown by the arrows.

A further arrangement is envisaged within the scope of the invention with four such connector portions operating conjointly.

Figure 13:
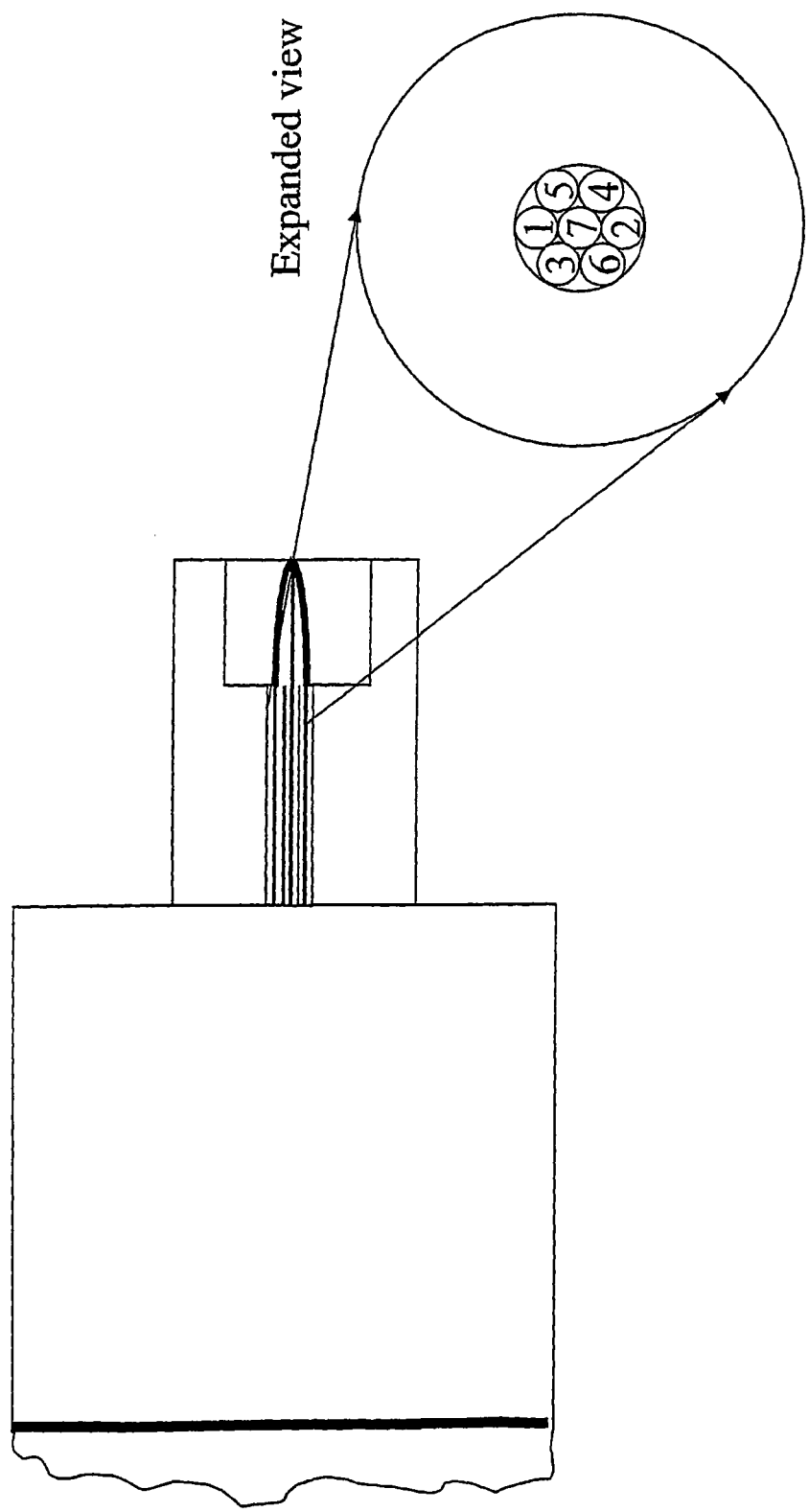
FIG. 13 is a diagram of the seventh embodiment in a fourth version of its "mated" (second mode of use) state.

FIG. 13 shows an optical-connector arrangement, in which a connector-portion contains a number of pairs of optical guides (fibres) arranged in parallel or in any other direction as appropriate, the number shown being three pairs with one central fibre. Due to the symmetry of the structure, it is possible to arrange the seven fibres shown along the centre of the ferrule with a high degree of accuracy. In the example shown fibre 1 is paired with fibre 2, fibre 3 is paired with fibre 4, and fibre 5 is paired with fibre 6. The central fibre 7 operates as a standard "straight through" connector, which could be useful in monitoring closure of the connector. This arrangement has the benefit that multiple connections can be simultaneously made by sharing the same mating aperture. It should be apparent that a different number of pairs of fibres may be similarly arranged by changing the diameter of the centre fibre and, further, this feature can be used in combination with any of appropriate beam collimation and redirection methods.

Figure 14:
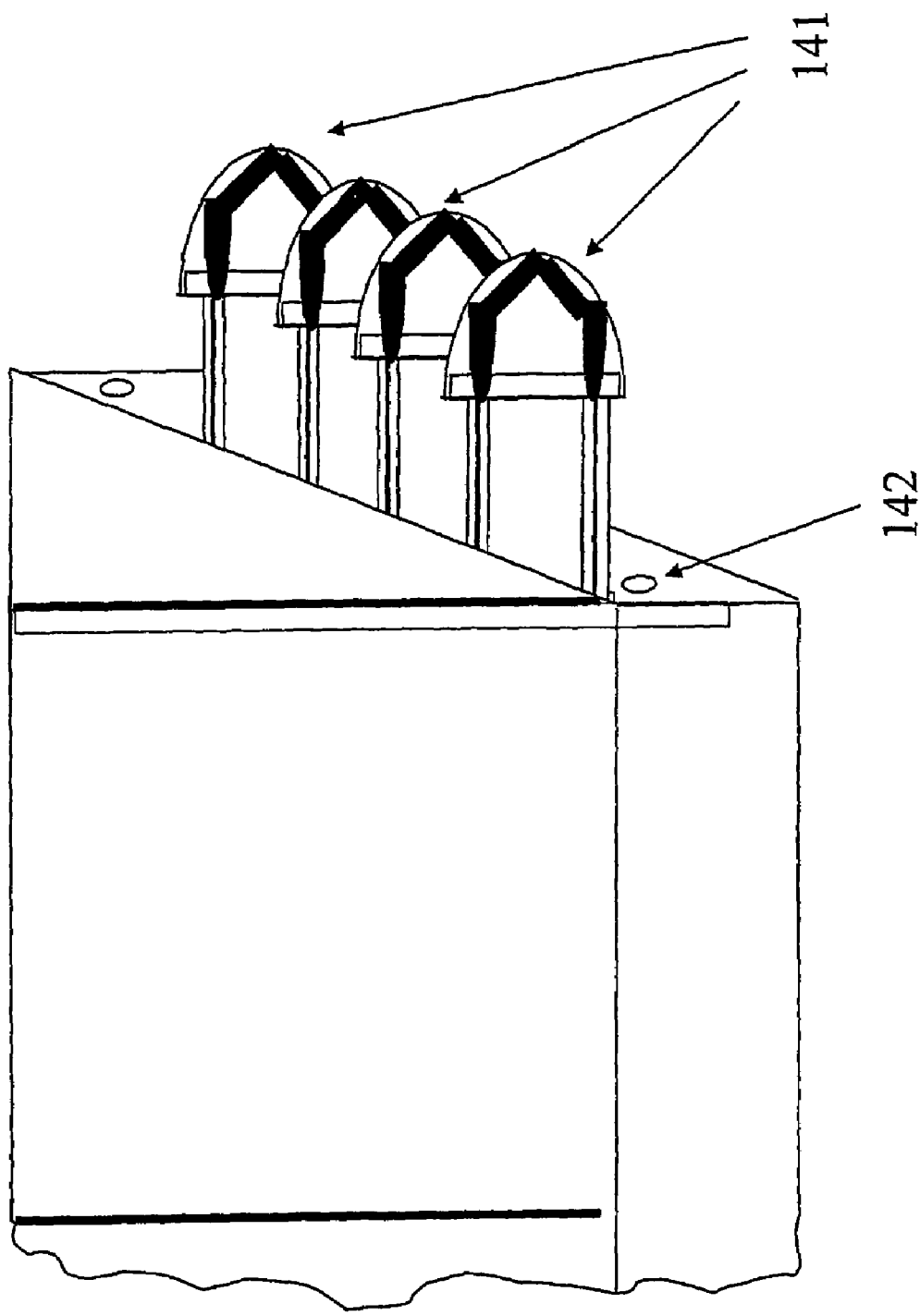
FIG. 14 illustrates a second optical-connector arrangement involving multiple optical guides.

FIG. 14 shows an alternative multi-fibre arrangement. In this arrangement, two arrays of fibres are aligned vertically one above another, and pairs of fibres are associated with respective connector-portions. There are shown four connector portions 141 with a connector alignment groove 142. Preferably, this is constructed by using two arrays of fibres mounted in alignment grooves in a substrate such as silicon or plastic, the two arrays then being vertically aligned relative to each other in order to achieve fibre pairings. An array of optical elements used for the reflection and focussing functions may be formed using any of the optical devices shown in any appropriate preceding figures.

Advantageously, in such multi-fibre connector arrangements, the action of mating connectors will disconnect some pairs of fibres, while simultaneously mating other pairs of fibres. This will have a number of network applications.

In order to eliminate or at least minimise moisture ingress or condensation, the invention envisages the use of a moisture-tight cap on the end of the first connector-portion, thereby retaining the air gap, or the provision of a single-use sacrificial protective layer, as shown in FIG. 1a. However, this approach may be deemed unreliable in some applications, and it does not permit the end-face (mating surface) of the connector-portion to be cleaned without disrupting the total internal reflection. In addition, once the protective layer or end-cap is removed, condensation may form on the end of the connector, disrupting the total internal reflection, and thus increasing the loss of the connector and destroying the inherent eye-safe property of the connector (see later).

Figure 15:
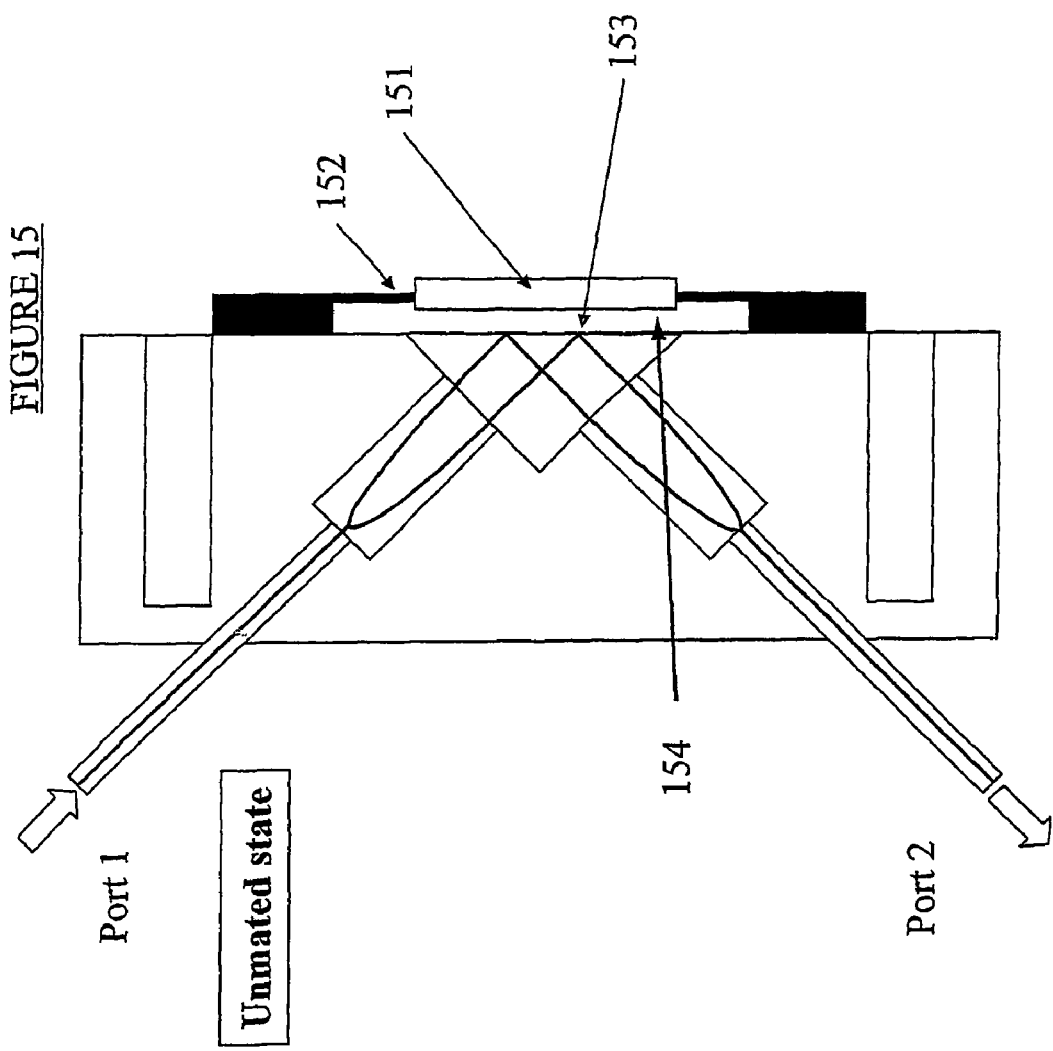
FIG. 15 is a diagram of the first embodiment of an optical connector in its first mode of use in accordance with the invention in a moisture-resistant form.

A moisture-resistant first connector-portion is shown in FIG. 15. This incorporates a thin block of glass 151 of substantially the same index as the prism shown, retained by a flexible membrane 152 which holds it a few microns offset from the prism surface 153, and which also acts as a hermetic seal. A void 154 is formed between the glass block and the prism surface which is hermetically or moisture sealed. When two such connectors are mated, the flexible membrane is deformed allowing both thin glass blocks to contact the prisms, thus allowing the optical signals to pass through to the opposing optical guides. This connector therefore has the advantage of being moisture-resistant, and also permitting easy cleaning without disrupting the total internal reflection when in the unmated state.

Figure 16:
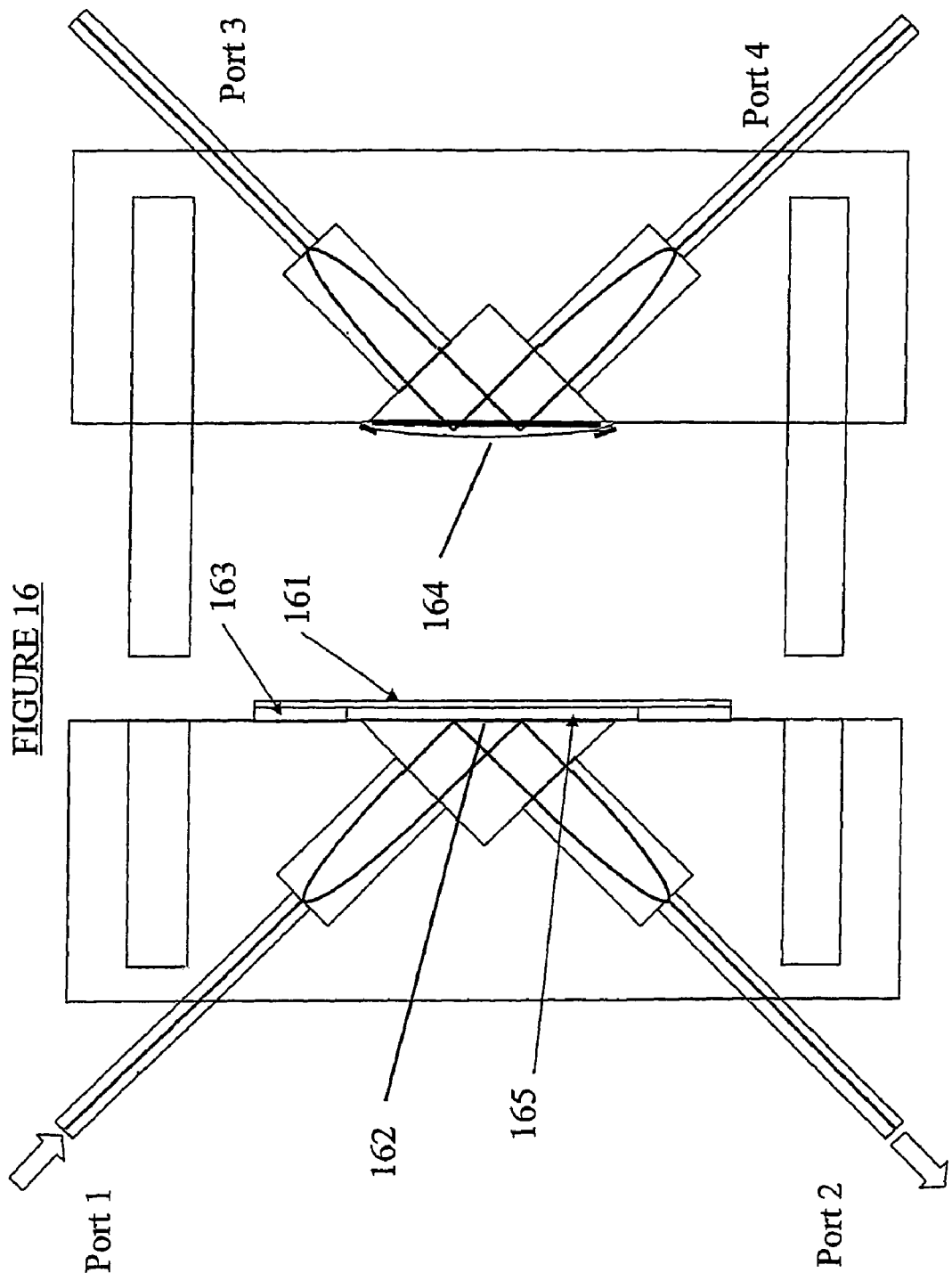
FIG. 16 is a version of a moisture resistant connector with a second dissimilar mating connector shown

FIG. 16 shows a preferred embodiment of a moisture-resistant optical connector. The first connector-portion on the left is moisture-resistant. It has a thin membrane 161 of index-matched glass (e.g. 20 microns thick) spaced from the total internal reflection surface 162 by glass blocks 163 of for example, 10 microns and hermetically enclosing a compressible, non-condensing, low-index medium 165 such as dry nitrogen. The right-hand connector-portion is not moisture-resistant, and has a curved surface 164 of, for example, 10 mm radius. When these two connector-portions are closed, the rounded surface of the second connector-portion forces the glass membrane against the surface 162, thereby coupling the optical signal to ports 3 and 4.

To minimise levels of cross coupling in the mated state, the mating surface of the glass block membrane can be at a small angle to the internal TIR surface. Alternatively or in addition, cross coupling and loss in the mated state may be reduced by the addition of a small amount of index-matched fluid to the mating surface prior to connection.

An alternative design of moisture-resistant connector is to select the refractive index of the first connector-portion end-face to be such that total internal reflection will still occur even when this end-face is coated with moisture. An example of a suitable material for this purpose is $TiO_2$ (rutile), having a refractive index of around 2.2. It should be noted that, where materials of dissimilar refractive indices are used, antireflection coatings may be employed to reduce losses where required.

Multi-Path Interference (MPI) can occur when an optical signal can be split into two paths and then recombined. In a number of applications, MPI needs to be kept very low— example, the interfering signal needs to be 50 dB lower in magnitude than the main signal. When the connector according to the invention couples in an optical element, as in FIG. 1, residual reflectivity within the connector in the mated state can constitute an interfering signal.

Figure 17:
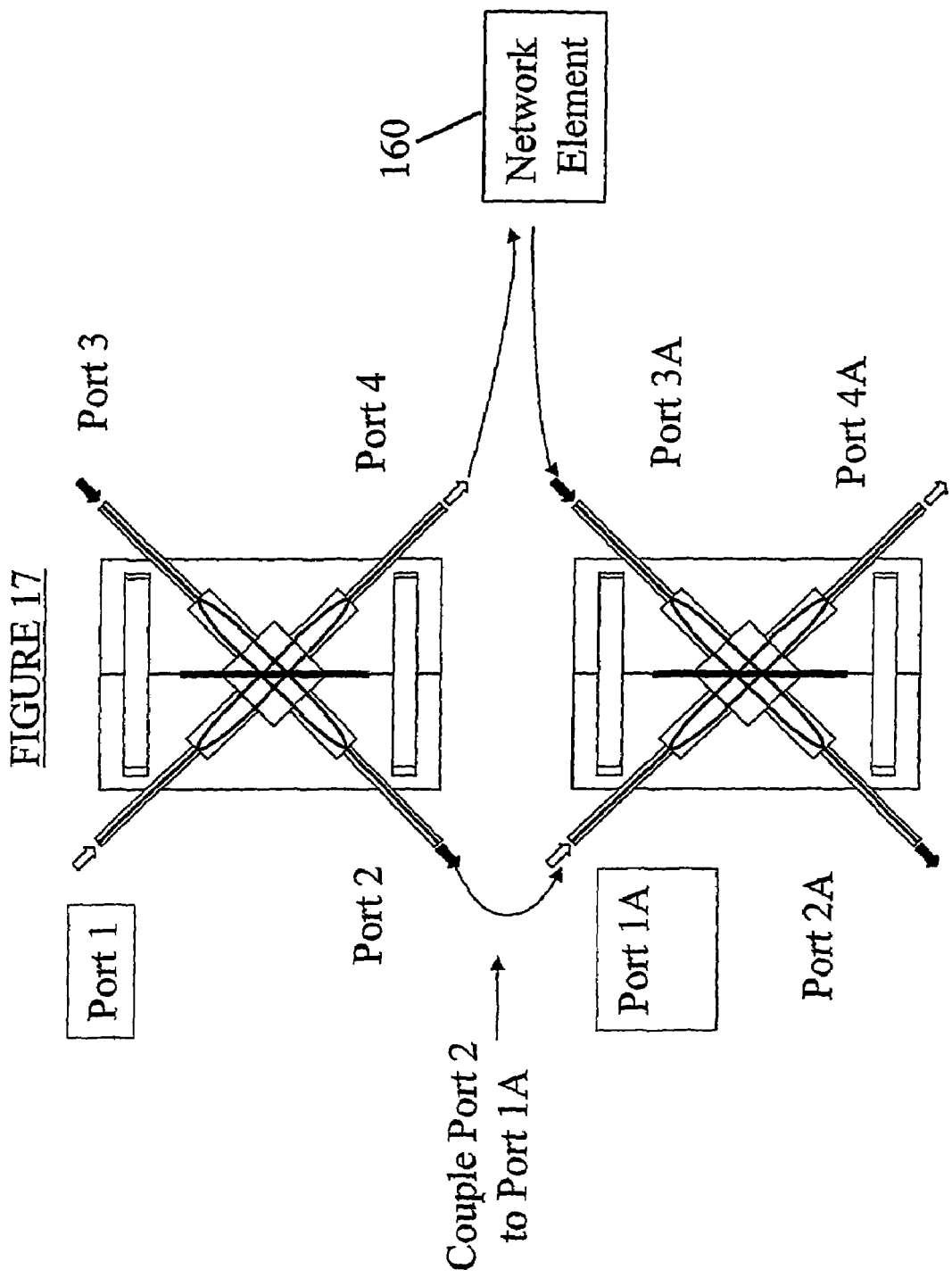
FIG. 17 is a diagram illustrating a cascaded arrangement of optical connectors under the invention.

FIG. 17 shows a method of cascading two connectors to double the MPI rejection. In the unmated state the signal takes the path Port 1-Port 2-Port 1A-Port 2A, undergoing total internal reflection twice. The network element 160 is connected from Port 4 to Port 3A. In the mated case, the main path is Port 1-Port 4-network element-Port 3A-Port 2A, while the Interfering signal takes the path Port 1-Port 2-Port 1A-Port 2A. In this case, the unwanted signal undergoes two reflections (example, −40 dB each, giving total rejection of −80 dB). The two connectors are preferably part of a multi-way connector structure, as in FIG. 13 or FIG. 14. Alternatively, Port 2 could be connected internally to Port 1A, for example using an internal reflector.

Figure 18:
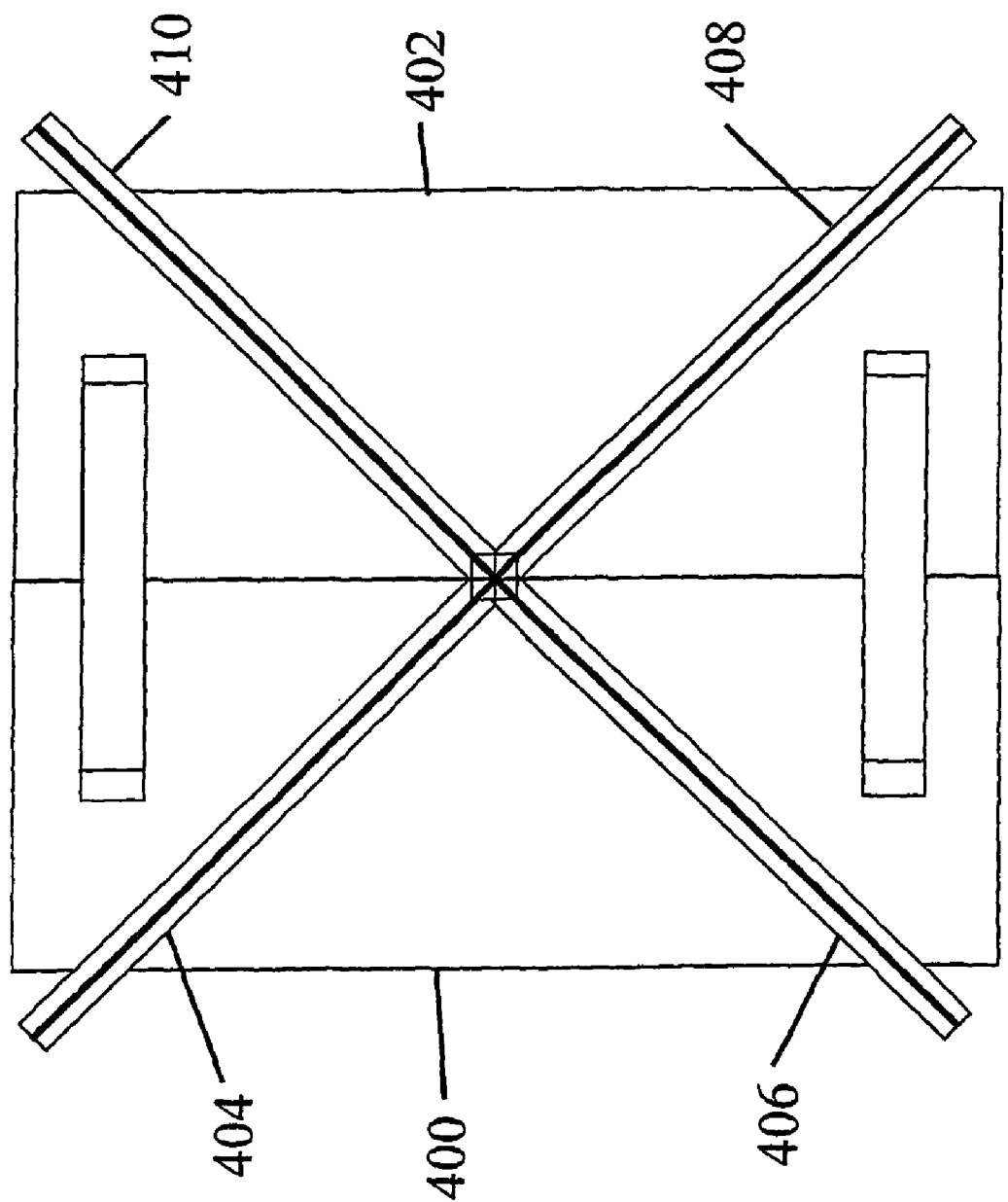
FIG. 18 shows an optical connector according to the invention in an eighth embodiment thereof.

A final embodiment of the optical connector in accordance with the invention is illustrated in FIG. 18. In FIG. 18 an optical connector in its second mode of use comprises first and second connector-portions 400, 402, in which are accommodated optical guides 404, 406, 408, 410 without the addition of collimators or refractive elements. These guides converge at an angle (e.g. 45°) onto the respective mating surfaces, where again the mating surface of the first connector-portion 400 acts as a total internal reflector in the first mode of operation. Since the two connector-portions are in contact with each other, the optical radiation in the optical guide 404 is passed straight through to the optical guide 408 and the return radiation entering the guide 410 is passed straight through to the guide 406.

In this embodiment, it is important that the mating ends of the optical guides be accurately cut and polished so as to avoid spurious airgaps, which might impair the transmission from the first connector-portion to the second and vice-versa.

It is worth mentioning that, for certain functions, the new optical element need not be external to the second connector-portion, but could be integral with it. Examples would include filters, taps, sensors, isolators and/or optoelectronic components.

Figure 19:
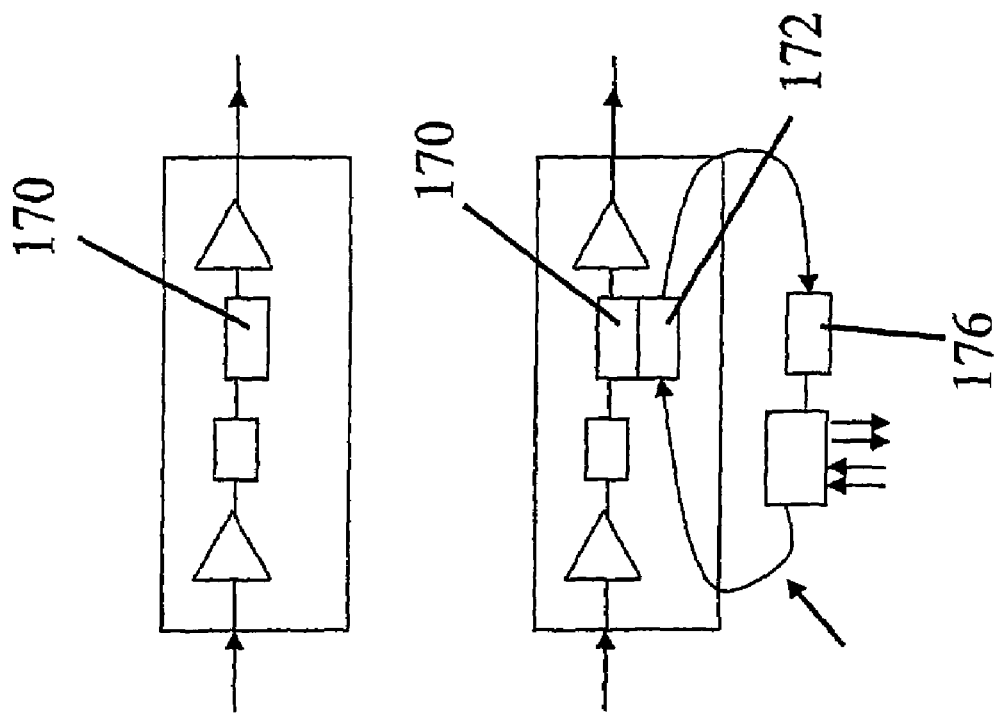
FIGS. 19 to 21 show various applications in which the optical connector according to the invention may be employed.

FIG. 19 shows a particular advantageous use of the inventive connector. A first connector-portion (or connector) 170 is included into a line, as shown. An optical add drop multiplexer (OADM) filter 174 is connected to a second connector-portion in a loop configuration. When the two halves of the connector are mated, the signal is rerouted through the OADM filter. The interruption to the traffic is brief (<<10 ms), which can be tolerated by many optical systems. In order to include further expansion capability, a second optical connector according to the invention 176 can be included in the loop.

The connector may also be used to provide flexibility points between amplifier nodes.

Figure 20:
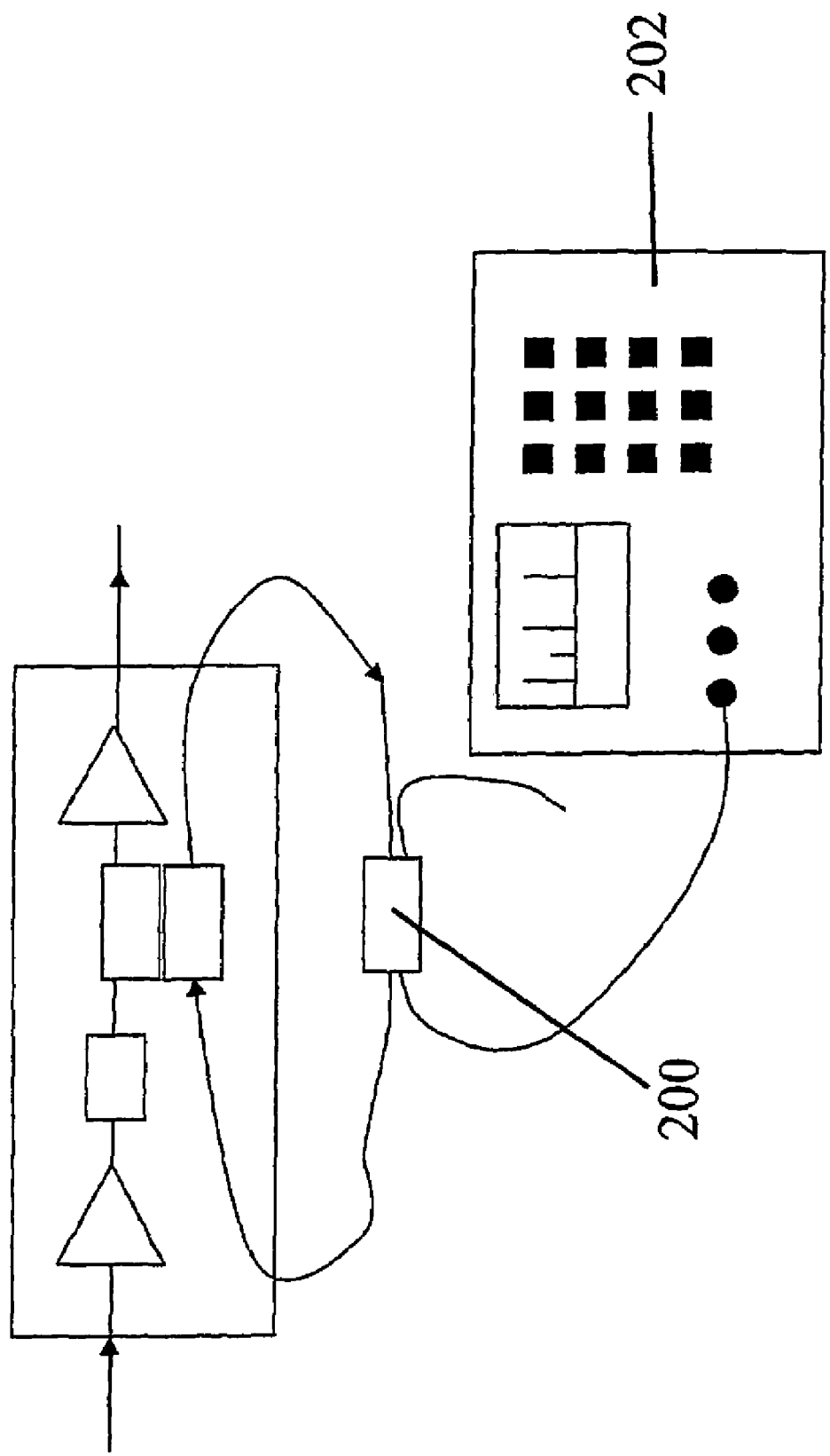

In a number of upgrade or maintenance scenarios, it is useful to be able to measure an optical signal on the line without breaking the traffic path. This can be accomplished by means of a connector coupled to a tap coupler 200 (which typically taps 1% to 10% of the signal), as shown in FIG. 20. Again, the connector breaks the optical path for <<10 ms. The tapped signal can then be fed to measurement equipment 202 as required.

An alternative means of introducing an optical tap is by creating a small separation of order 1 micron between the two mating surfaces of the connector, which would cause partial frustration of the reflection at the interface and thereby allowing a fraction of the light in the first connector-portion to be coupled in to the respective guides of the second connector portion. One way in which this separation could be achieved is by appropriate design of the snap-action mechanism described earlier such that an intermediate closure force brings the two surfaces to a defined spacing.

Using the connector, an amplifier 204 may be inserted into a line.

Figure 21:
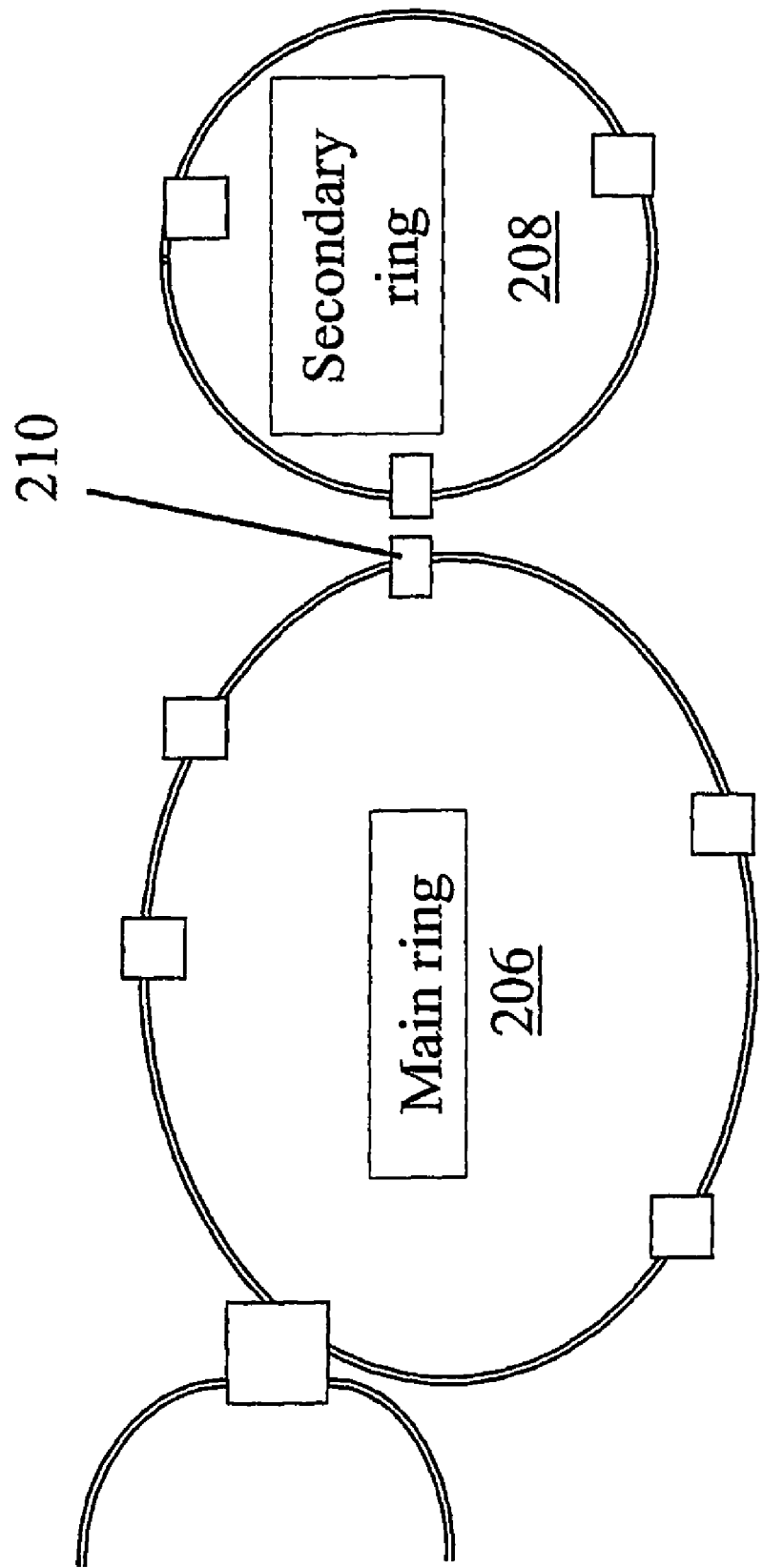

FIG. 21 shows the use of a connector in accordance with the invention to link two existing rings—a main ring 206 and a secondary ring 208—into a single larger ring. In practice, to achieve this the following steps are preferably taken: firstly, before the two connector-halves are mated, the traffic at those ring nodes adjacent the first connector-portion is rerouted; then the connector halves are mated and new paths are commissioned through the enlarged ring and, finally, the new paths are made available to the traffic which had been rerouted.

Dispersion is an important problem in many optical systems, since it causes pulse spreading as the signal travels along fibre systems. Dispersion is a particular issue on higher speed systems (10 Gbps and upwards) or with non-optimum fibre types. A simple optical-fibre system (e.g. 2.5 Gbps, few wavelengths) can be deployed with minimal dispersion compensation. Upgrade of some wavelengths to 10 Gbps/40 Gbps then requires the addition of Dispersion Compensating Modules (DCMs) or Dispersion Slope Compensating Modules (DSCMs). This can be accomplished by first measuring the signal quality using an optical connector according to the invention with tap coupler and dispersion measurement equipment, as partially described in connection with FIG. 20. The dispersion measurement equipment can then be used to calculate the optimum value of a fixed dispersion compensation. This tap coupler and measurement equipment can then be replaced by a low-cost fixed DCM or DSCM.

Figure 22:
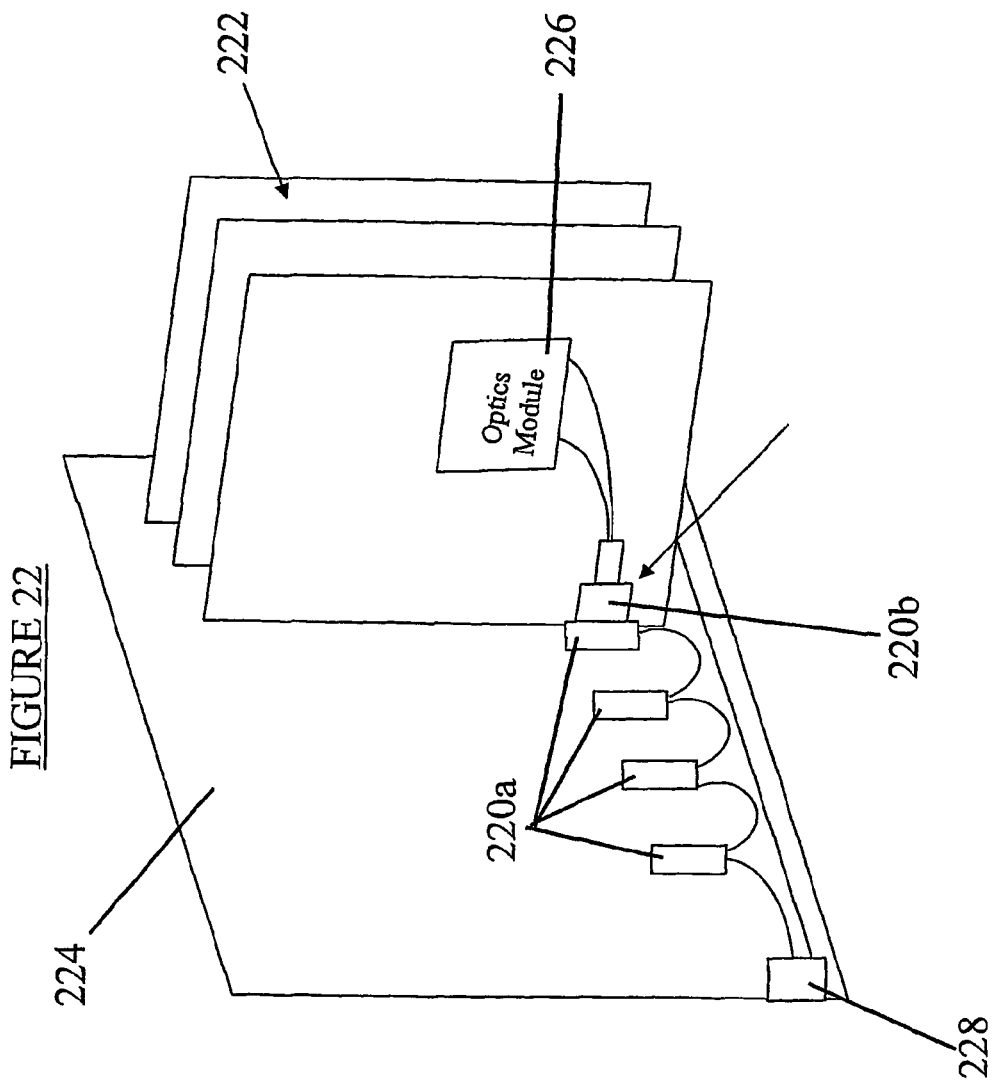
FIG. 22 shows a backplane implementation of an optical-connector arrangement involving optical connectors in accordance with the invention.

FIG. 22 shows a number of connectors 220a, 220b in accordance with the invention being used in an optical backplane application. The configuration allows circuit boards 222 to be plugged into the backplane 224, with the optical signal being routed through each such board to an optical element or module 226 mounted on the board. The backplane connectors may be single connectors or "multiple" connectors. Various configurations of "wiring up" the backplane are of course possible, only one being shown here. It is advantageous in this application to use connectors which permit the signal to be rotated through large angles, for example as shown in FIG. 11. A mix of connector types is of course possible, e.g. a connector-portion configuration as shown in FIG. 1 on the backplane together with a mating connector-portion configuration as shown in FIG. 2. This requires that the optical radiations (beams) in the optical guides subtend the same angles in the two configurations (e.g. 45° to the normal) and that the beam diameters and index of the mating surfaces also match between the two. The external interface to the backplane (if required) may be directly via an off-shelf connector 228, or could be via on-card connectors (not shown).

Figure 23A:
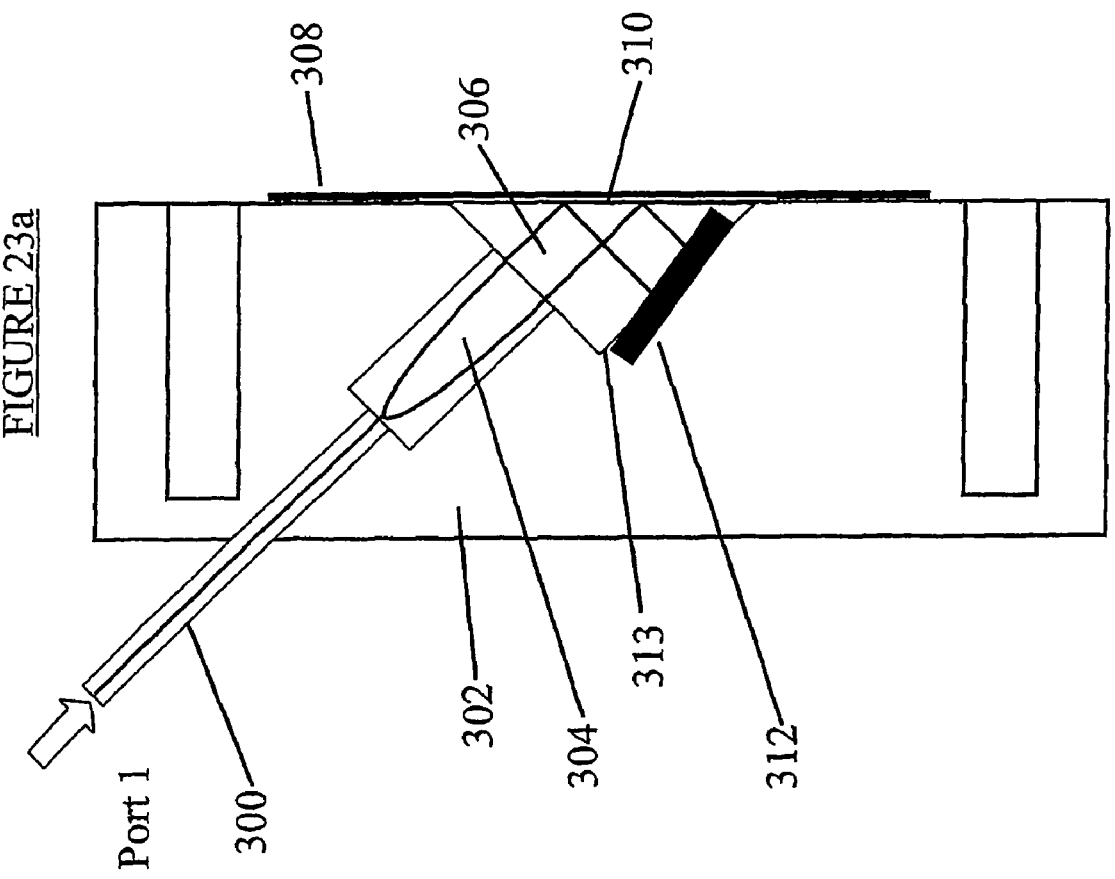
FIGS. 23a and 23b are diagrams showing the use of an optical connector according to the invention in the first embodiment thereof as an eye-safe connector.

The first connector-portion of an optical connector according to the invention will not emit significant levels of radiation when employed in its first mode of use, provided the second optical guide is properly terminated. Where the optical connector is only required to be of the single-port type, it is possible to terminate the second port (second optical guide) internally within the connector. FIG. 23a shows the first connector-portion of the afore-described first embodiment of an optical connector according to the invention, in which a fibre 300 is accommodated in the body 302 of the connector portion and communicates with a collimating element 304, which in turn is connected to a prism 306 acting at its outwardly facing side 310 as a total internal reflecting surface. A protective cover 308 may optionally also be provided as explained earlier.

Different here, however, is the fact that the optical signal reflected from the surface 310 is absorbed in an optical dump 312 provided on the face 313 of the prism 306 upon which the reflected signal impinges. As an alternative, a reflector may be provided at this point, which will reflect the impinging signal back along substantially the same path, this return signal then being again reflected from the face 310 and back along the optical fibre 300 in the opposite direction. This will have the effect of enhancing the return signal which is relied on in the earlier described ALS systems. (In such known systems the main reflecting surface (here 310) is usually normal to the fibre axis). If it is desired to maintain the same reflectivity as a standard FC/PC type optical connector, the reflector could be in the form of an air gap.

Figure 23B:
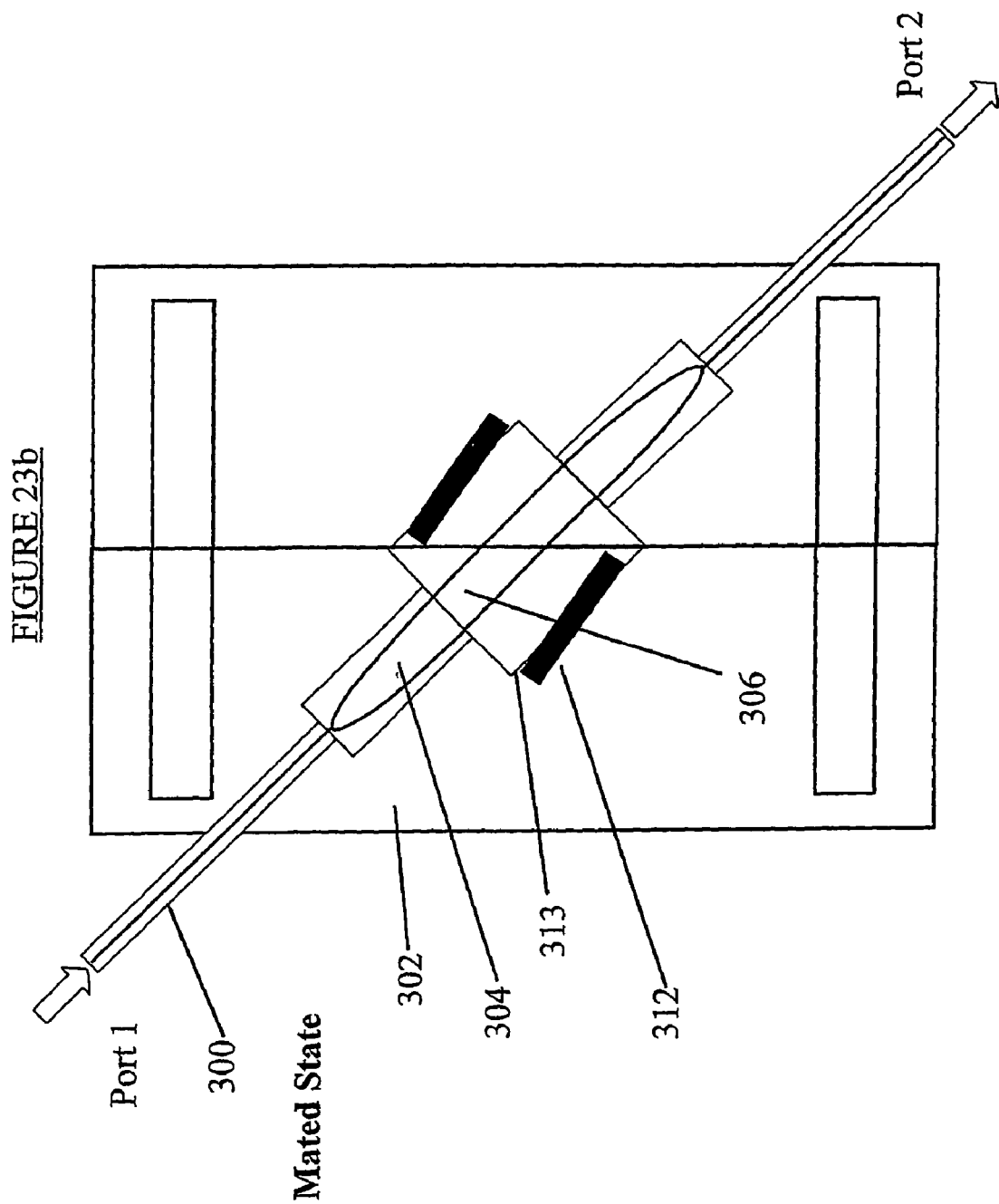

The more normal mode of operation of such an eye-safe arrangement is to have the first connector-portion illustrated in FIG. 23a connected to its corresponding second connector-portion (see FIG. 23b). The latter would take the form of the second connector-portion shown in FIG. 1b. As with the first connector-portion shown in FIG. 23a, this second connector-portion would have a single optical port (optical guide) for passing the optical signal on to the fibre section to which the second connector-portion was connected.

As a still further alternative, a fluorescent material may be used as the coating 312, this then providing a visual indication of the presence of an optical signal within the connector to service personnel, who can then take any required action.

A variant of the latter arrangement would be to provide means for visually indication a fibre break. This may be achieved by replacing the afore-mentioned coating 312 by a string of three or four photodiodes in series with a visible LED or laser 314.

Of course, instead of using the angled optical-guide configuration of the first embodiment (FIG. 1), any of the other configurations may also be employed as appropriately selected by the person skilled in the art.

A second embodiment of an eye-safe connector arrangement is the subject of FIGS. 24a and 24b, in which a fibre is shown terminated in a connector-portion 320. The end of the fibre, which is received in a receiving means 321 is inserted in a ferrule 322 which may be 2.5 mm in diameter, the outer end of which may be polished off 1.5 mm at an angle greater than 50 degrees to the angle of the core, as shown. The cut, an enlarged version of which is shown as item 324 in FIG. 24b, is made so that the optical signal impinging on the angled end-face of the ferrule is reflected towards the side-wall of the ferrule, as shown by the arrow, where it is absorbed.

In the other mode of use of the illustrated connector, a similar connector-portion is offered up to the end of the ferrule of the connector-portion 320 shown, so that the total internal reflecting operation at the ferrule/air interface 324 is frustrated, the signal then being able to pass into the opposing ferrule 325 and out into its own associated fibre section

The invention claimed is:

1. A first optical connector comprising:
   at least one optical guide for carrying optical radiations;
   a total internal reflection surface upon at least a portion of which, in use, said radiations impinge, so that the radiation in the optical guide is reflected by said surface towards an optical element of the first connector; and
   a push-fit portion for attaching and aligning said first optical connector to a second optical connector which is appropriately matingly configured, said portion of said total internal reflection surface being disposed independent of said push-fit portion.

2. A first optical connector according to claim 1, wherein the surface is such that, in use, the radiation in the optical guide may be reflected by said surface towards an optical element of the connector and may alternatively, in use, be such that its internal reflection properties may be frustrated to allow the radiation to pass across the surface.

3. A first optical connector according to claim 1 further comprising wherein the second connector incorporates means which will frustrate the total internal reflection of the first connector if and when the first connector were to be interlocked with the second connector; and with the push-fit portion being so operatively positioned that, with the first connector interlocked to the second connector as aforesaid, the total internal reflection surface of the first connector will be in sufficient proximity to the total internal reflection frustrating means of the second connector as to allow the optical radiations to pass across the connection then formed by the two interlocking connectors.

4. A first optical connector according to claim 1, wherein said optical element towards which radiation is reflected treats the radiation so that eye-damaging radiation remains within the first connector.

5. A first optical connector according to claim 1, wherein said first connector comprises a plurality of optical guides.

6. A first optical connector according to claim 1, wherein said push-fit portion incorporates interlocking means allowing a connector to be first attached in a non-surface frustrating manner and then incorporates a mechanism which provides a snap-action final closure for the frustration of the surface.

7. A first optical connector according to claim 5 further comprising additional reflection means between the optical guides and the surface.

8. A first optical connector according to claim 5 further comprising refractive means between the optical guides and the surface which change the radiation's direction as emitted from the optical guides to the direction of the radiation incident on the total internal reflection surface.

9. A first optical connector according to claim 5, wherein the total internal reflection surface is located on at least two sides of a prism.

10. A first optical connector according to claim 1, wherein the push-fit portion comprises at least one alignment pin.

11. A multiple-connector system comprising:
    a first optical connector including,
       at least one optical guide for carrying optical radiations,
       a total internal reflection surface upon at least a portion of which, in use, said radiations impinge, so that the radiation in the optical guide is reflected by said surface towards an optical element of the first connector,
       a push-fit portion for attaching and aligning said first optical connector to another optical connector which is appropriately matingly configured, said portion of said total internal reflection surface being disposed independent of said push-fit portion; and
    one or more other optical connectors, each of which other connectors is appropriately matingly configured to attach to and align with said first optical connector and which incorporates means which will frustrate the total internal reflection of said first connector if and when the other connector were to be fully pushed against said first connector,
    wherein the push-fit portion of said first connector is operatively positioned so that with said first connector fully pushed against said other connector as aforesaid, the total internal reflection surface of said first connector will be in sufficient proximity to the total internal reflection frustrating means of said other connector as to allow the optical radiations to pass across the connection then formed by the two attached connectors.

* * * * *